United States Patent
Aybay

(10) Patent No.: US 9,065,773 B2
(45) Date of Patent: Jun. 23, 2015

(54) METHODS AND APPARATUS FOR VIRTUAL CHANNEL FLOW CONTROL ASSOCIATED WITH A SWITCH FABRIC

(75) Inventor: Gunes Aybay, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 872 days.

(21) Appl. No.: 12/820,797

(22) Filed: Jun. 22, 2010

(65) Prior Publication Data
US 2011/0310739 A1 Dec. 22, 2011

(51) Int. Cl.
| | |
|---|---|
| H04L 12/931 | (2013.01) |
| H04L 12/801 | (2013.01) |
| H04L 12/825 | (2013.01) |
| H04L 12/933 | (2013.01) |
| H04L 12/861 | (2013.01) |
| H04L 12/937 | (2013.01) |

(52) U.S. Cl.
CPC .............. H04L 49/505 (2013.01); H04L 47/10 (2013.01); H04L 47/266 (2013.01); H04L 49/1515 (2013.01); H04L 49/253 (2013.01); H04L 49/90 (2013.01)

(58) Field of Classification Search
None
See application file for complete search history.

(56) References Cited

U.S. PATENT DOCUMENTS

| | | | |
|---|---|---|---|
| 5,457,687 | A | 10/1995 | Newman |
| 5,926,473 | A | 7/1999 | Gridley |
| 5,987,008 | A | 11/1999 | Simpson et al. |
| 5,987,028 | A | 11/1999 | Yang et al. |
| 5,991,295 | A | 11/1999 | Tout et al. |
| 6,049,546 | A | 4/2000 | Ramakrishnan |
| 6,073,089 | A | 6/2000 | Baker et al. |
| 6,324,165 | B1 | 11/2001 | Fan et al. |
| 6,370,145 | B1 | 4/2002 | Dally et al. |
| 6,438,107 | B1 | 8/2002 | Somiya et al. |
| 6,512,747 | B1 | 1/2003 | Umeuchi et al. |
| 6,618,357 | B1 | 9/2003 | Geyer et al. |
| 6,621,828 | B1 | 9/2003 | Filed et al. |

(Continued)

FOREIGN PATENT DOCUMENTS

| | | |
|---|---|---|
| EP | 1 133 110 A2 | 9/2001 |
| EP | 1 653 685 A1 | 5/2006 |

(Continued)

OTHER PUBLICATIONS

Search Report for European Application No. 09170041.9, mailed Nov. 23, 2009 (8 pages).

(Continued)

*Primary Examiner* — Chirag Shah
*Assistant Examiner* — Amar Persaud
(74) *Attorney, Agent, or Firm* — Cooley LLP

(57) ABSTRACT

A system includes a module associated with a first stage of a switch fabric directly coupled to a module associated with a second stage of the switch fabric via a single physical hop having multiple virtual channels. The module associated with the first stage is configured to assign a virtual channel identifier associated with a virtual channel with a data packet using a hash function and to send the data packet through the virtual channel based on the virtual channel identifier. The module associated with the second stage is configured to send a flow control signal to the module associated with the first stage when an available capacity of a queue is less than a predetermined threshold. The module associated with the first stage is configured to suspend sending data packets via the virtual channel in response to the flow control signal.

19 Claims, 8 Drawing Sheets

(56) References Cited

U.S. PATENT DOCUMENTS

| | | |
|---|---|---|
| 6,657,962 B1 | 12/2003 | Barri et al. |
| 6,856,622 B1 | 2/2005 | Calamvokis et al. |
| 6,944,173 B1 | 9/2005 | Jones et al. |
| 6,973,032 B1 | 12/2005 | Casley et al. |
| 6,977,932 B1 | 12/2005 | Hauck |
| 6,986,161 B2 | 1/2006 | Billhartz |
| 7,027,404 B2 | 4/2006 | Sreejith et al. |
| 7,027,457 B1 | 4/2006 | Chiussi et al. |
| 7,042,842 B2 | 5/2006 | Paul et al. |
| 7,046,631 B1 | 5/2006 | Giroux et al. |
| 7,061,862 B2 | 6/2006 | Horiguchi et al. |
| 7,075,934 B2 | 7/2006 | Chiussi et al. |
| 7,085,846 B2 | 8/2006 | Jenne et al. |
| 7,173,931 B2 | 2/2007 | Chao et al. |
| 7,185,368 B2 | 2/2007 | Copeland, III |
| 7,230,947 B1 | 6/2007 | Huber et al. |
| 7,233,568 B2 | 6/2007 | Goodman et al. |
| 7,234,168 B2 | 6/2007 | Gupta et al. |
| 7,269,666 B1 | 9/2007 | Leitner et al. |
| 7,277,429 B2 | 10/2007 | Norman et al. |
| 7,283,471 B2 | 10/2007 | Gutierrez et al. |
| 7,324,442 B1 | 1/2008 | Pan et al. |
| 7,327,680 B1 | 2/2008 | Kloth |
| 7,372,813 B1 * | 5/2008 | Cimino et al. ............... 370/235 |
| 7,391,736 B2 | 6/2008 | Na et al. |
| 7,403,524 B2 | 7/2008 | Hill |
| 7,424,744 B1 | 9/2008 | Wu et al. |
| 7,430,175 B2 | 9/2008 | Dropps et al. |
| 7,440,448 B1 | 10/2008 | Lu et al. |
| 7,457,245 B2 | 11/2008 | McAlpine et al. |
| 7,519,860 B2 | 4/2009 | Hatonen et al. |
| 7,540,025 B2 | 5/2009 | Tzadikario |
| 7,543,052 B1 | 6/2009 | Cesa Klein |
| 7,564,869 B2 | 7/2009 | Cafiero et al. |
| 7,643,418 B1 | 1/2010 | Varier et al. |
| 7,701,849 B1 | 4/2010 | Ma |
| 7,719,982 B2 | 5/2010 | Varma |
| 8,154,996 B2 | 4/2012 | Godbole et al. |
| 8,160,072 B1 * | 4/2012 | Gnanasekaran et al. ...... 370/392 |
| 8,213,308 B2 | 7/2012 | Godbole et al. |
| 8,218,442 B2 | 7/2012 | Godbole et al. |
| 8,228,797 B1 | 7/2012 | Utley et al. |
| 8,254,255 B2 | 8/2012 | Thomas |
| 8,325,749 B2 | 12/2012 | Thomas et al. |
| 2002/0057699 A1 | 5/2002 | Roberts |
| 2002/0064170 A1 | 5/2002 | Siu et al. |
| 2002/0075883 A1 | 6/2002 | Dell et al. |
| 2002/0080789 A1 | 6/2002 | Henderson et al. |
| 2002/0118692 A1 | 8/2002 | Oberman et al. |
| 2002/0154637 A1 | 10/2002 | Keller-Tuberg |
| 2002/0167950 A1 | 11/2002 | Chang et al. |
| 2003/0005145 A1 | 1/2003 | Bullard |
| 2003/0023733 A1 | 1/2003 | Lingafelt et al. |
| 2003/0026267 A1 | 2/2003 | Oberman et al. |
| 2003/0026287 A1 | 2/2003 | Mullendore et al. |
| 2003/0035432 A1 | 2/2003 | Sreejith et al. |
| 2003/0058880 A1 | 3/2003 | Sarkinen et al. |
| 2003/0063348 A1 | 4/2003 | Posey |
| 2003/0218977 A1 | 11/2003 | Pan et al. |
| 2004/0001433 A1 | 1/2004 | Gram et al. |
| 2004/0013124 A1 | 1/2004 | Peebles et al. |
| 2004/0165598 A1 | 8/2004 | Shrimali et al. |
| 2004/0208181 A1 * | 10/2004 | Clayton et al. ............ 370/395.4 |
| 2005/0036502 A1 | 2/2005 | Blanc et al. |
| 2005/0108444 A1 | 5/2005 | Flauaus et al. |
| 2005/0111460 A1 | 5/2005 | Sahita |
| 2005/0138238 A1 | 6/2005 | Tierney et al. |
| 2005/0138243 A1 | 6/2005 | Tierney et al. |
| 2005/0210533 A1 | 9/2005 | Copeland, III |
| 2005/0226156 A1 | 10/2005 | Keating et al. |
| 2005/0249214 A1 | 11/2005 | Peng |
| 2005/0276263 A1 | 12/2005 | Suetsugu et al. |
| 2006/0067225 A1 * | 3/2006 | Fedorkow et al. ............ 370/235 |
| 2006/0104298 A1 | 5/2006 | McAlpine et al. |
| 2006/0120289 A1 | 6/2006 | Cunningham |
| 2006/0123480 A1 | 6/2006 | Oh et al. |
| 2006/0146703 A1 | 7/2006 | Cha et al. |
| 2006/0221974 A1 * | 10/2006 | Hilla et al. .................... 370/394 |
| 2006/0272018 A1 | 11/2006 | Fouant |
| 2006/0285548 A1 | 12/2006 | Hill et al. |
| 2007/0064617 A1 | 3/2007 | Reves |
| 2007/0067438 A1 | 3/2007 | Goranson et al. |
| 2007/0086464 A1 | 4/2007 | Somashekhar |
| 2007/0094729 A1 | 4/2007 | Hoefelmeyer et al. |
| 2007/0118909 A1 | 5/2007 | Hertzog et al. |
| 2007/0150949 A1 | 6/2007 | Futamura et al. |
| 2007/0180526 A1 | 8/2007 | Copeland, III |
| 2007/0192861 A1 | 8/2007 | Varghese et al. |
| 2007/0240207 A1 | 10/2007 | Belakhdar et al. |
| 2007/0268830 A1 | 11/2007 | Li et al. |
| 2008/0028096 A1 | 1/2008 | Henderson et al. |
| 2008/0028467 A1 | 1/2008 | Kommareddy et al. |
| 2008/0080548 A1 | 4/2008 | Mullendore et al. |
| 2008/0082977 A1 | 4/2008 | Araujo et al. |
| 2008/0151863 A1 | 6/2008 | Lawrence et al. |
| 2008/0198746 A1 | 8/2008 | Kwan et al. |
| 2008/0253289 A1 | 10/2008 | Naven et al. |
| 2008/0259798 A1 | 10/2008 | Loh et al. |
| 2008/0263661 A1 | 10/2008 | Bouzida |
| 2008/0285449 A1 | 11/2008 | Larsson et al. |
| 2009/0003212 A1 | 1/2009 | Kwan et al. |
| 2009/0077663 A1 | 3/2009 | Sun et al. |
| 2009/0300209 A1 | 12/2009 | Elzur |
| 2010/0061238 A1 | 3/2010 | Godbole et al. |
| 2010/0061239 A1 | 3/2010 | Godbole et al. |
| 2010/0061390 A1 | 3/2010 | Godbole et al. |
| 2010/0085891 A1 | 4/2010 | Kind et al. |
| 2010/0158031 A1 | 6/2010 | Thomas et al. |
| 2011/0154132 A1 | 6/2011 | Aybay |
| 2011/0267942 A1 | 11/2011 | Aybay et al. |
| 2012/0140626 A1 | 6/2012 | Anand et al. |
| 2012/0195203 A1 | 8/2012 | Godbole et al. |
| 2012/0233349 A1 | 9/2012 | Aybay |
| 2012/0269065 A1 | 10/2012 | Godbole et al. |
| 2012/0275307 A1 | 11/2012 | Godbole et al. |

FOREIGN PATENT DOCUMENTS

| | | |
|---|---|---|
| EP | 1 892 905 A1 | 2/2008 |
| EP | 2 040 420 A1 | 3/2009 |
| EP | 2 180 644 A1 | 4/2010 |
| EP | 2 461 529 A1 | 6/2012 |
| GB | 2 361 139 A | 10/2001 |
| WO | WO 97/04546 | 2/1997 |

OTHER PUBLICATIONS

Office Action mailed Mar. 26, 2010 for U.S. Appl. No. 12/242,224 (17 pages).

Office Action mailed Mar. 29, 2010 for U.S. Appl. No. 12/242,230 (11 pages).

Office Action mailed Apr. 29, 2010 for U.S. Appl. No. 12/343,728 (21 pages).

Office Action mailed May 11, 2010 for U.S. Appl. No. 12/345,490 (12 pages).

F.K. Liotopoulos et al., "A Modular, 160 Gbps ATM Switch Architecture for Multimedia Networking Support, based on a 3-Stage Clos Network," Proceedings of the International Teletraffic Congress. ITC-16. Teletraffic Engineering in a Competitive World. Edinburgh, UK, Jun. 7, 1999, Amsterdam: Elsevier, NL, vol. 3A, XP000877657 ISBN: 978-0-444-50268-1, pp. 529-538.

William J. Dally, "Virtual-Channel Flow Control," IEEE Transactions on Parallel and Distributed Systems, vol. 3, No. 2, Mar. 1992, pp. 194-205.

U.S. Appl. No. 12/345,490, filed Dec. 29, 2008, entitled "Flow-Control in a Switch Fabric" (38 pgs).

U.S. Appl. No. 12/646,114, filed Dec. 23, 2009, entitled "Methods and Apparatus for Tracking Data Flow Based on Flow State Values" (50 pgs).

U.S. Appl. No. 12/771,413, filed Apr. 30, 2010, entitled "Methods and Apparatus for Flow Control Associated with a Switch Fabric" (44 pgs).

(56) References Cited

OTHER PUBLICATIONS

Mohammad Alizadeh et al. "Data Center TCP (DCTCP)" SIGCOMM'10, Aug. 30-Sep. 3, 2010, New Delhi, India, Copyright 2010 ACM 978-1-4503-0201-Feb. 10, 2008 (12 pages).
Cyriel Minkenberg et al. "Adaptive Routing for Convergence Enhanced Ethernet," In Proc Int Conf on High Performance Switching and Routing (HPSR), pp. 1-8, Jun. 22-24, 2009.
Yu-xiang Hu et al. "QoS-supported Scheduling Algorithm in Multi-stage Switching Fabrics," Computer Science, vol. 35, Issue 5, pp. 31-83, Fig. 2.
Office Action mailed Oct. 15, 2010 for U.S. Appl. No. 12/343,728.
Office Action mailed May 2, 2011 for U.S. Appl. No. 12/343,728.
Final Office Action mailed Oct. 7, 2011 for U.S. Appl. No. 12/343,728.
U.S. Appl. No. 13/692,425, filed Dec. 3, 2012, entitled "Methods and Apparatus for Transmission of Groups of Cells Via a Switch Fabric".
Office Action mailed Sep. 17, 2010 for U.S. Appl. No. 12/242,224.
Office Action mailed Aug. 9, 2011 for U.S. Appl. No. 12/242,224.
Office Action mailed Sep. 17, 2010 for U.S. Appl. No. 12/242,230.
Office Action mailed Mar. 17, 2011 for U.S. Appl. No. 12/242,230.
Office Action mailed Oct. 6, 2011 for U.S. Appl. No. 12/242,230.
Office Action mailed May 23, 2011 for U.S. Appl. No. 12/558,118.
Office Action mailed Nov. 27, 2012 for U.S. Appl. No. 13/541,080.
Office Action mailed Oct. 15, 2010 for U.S. Appl. No. 12/345,490.
Office Action mailed Apr. 1, 2011 for U.S. Appl. No. 12/345,490.
Office Action mailed Aug. 19, 2011 for U.S. Appl. No. 12/345,490.
U.S. Appl. No. 13/594,385, filed Aug. 24, 2012, entitled "Flow-Control in a Switch Fabric".
Office Action mailed Mar. 26, 2012, for U.S. Appl. No. 12/646,114.
Final Office Action mailed Jul. 19, 2012, for U.S. Appl. No. 12/646,114.
Non-Final Office Action for U.S. Appl. No. 12/771,413, mailed May 24, 2012.
Final Office Action for U.S. Appl. No. 12/771,413, mailed Jan. 11, 2013.
U.S. Appl. No. 12/859,015, filed Aug. 18, 2010, entitled "Fibre Channel Credit-Based Link Flow Control Overlay Onto Fibre Channel Over Ethernet" (41 pgs).
Office Action Mailed Nov. 7, 2012 for U.S. Appl. No. 12/859,015.
U.S. Appl. No. 12/953,149, filed Nov. 23, 2010, entitled "Methods and Apparatus for Destination Based Hybrid Load Balancing Within a Switch Fabric" (49 pgs).
U.S. Office Action for U.S. Appl. No. 12/953,149, mailed Jan. 3, 2013.
U.S. Appl. No. 13/044,023, filed Mar. 9, 2011, entitled "Methods and Apparatus for Path Selection Within a Network Based on Flow Duration".
U.S. Appl. No. 13/252,615, filed Oct. 4, 2011, entitled "Methods and Apparatus for Multi-Path Flow Control Within a Multi-Stage Switch Fabric".
Examination Report for European Application No. 09170041.9, mailed Mar. 13, 2012 (7 pages).
Office Action for Chinese Application No. 200910246889.0, mailed Nov. 23, 2012 (19 pages).
Partial Search Report for European Application No. 11188568.7, mailed Feb. 22, 2012 (5 pgs).
Extended Search Report for European Application No. 11188568.7, mailed Jun. 20, 2012 (8 pgs).
Extended Search Report for European Application No. 12158266.2, mailed Jun. 29, 2012 (7 pgs).

\* cited by examiner

METHODS AND APPARATUS FOR VIRTUAL CHANNEL FLOW CONTROL ASSOCIATED WITH A SWITCH FABRIC

BACKGROUND

Embodiments described herein relate generally to flow control, and, in particular, to virtual channel flow control associated with multi-staged switch fabrics.

Transmission of data from a transmitter to a receiver via a physical link (e.g., an Ethernet link) can be, for example, disrupted because of congestion at a queue configured to receive the data at the receiver. In some instances, the disruption can cause head-of-line (HOL) blocking and/or result in the loss of at least portions of the data due to buffer overflow. Known flow control protocols such as Ethernet pause (Institute of Electrical and Electronics Engineers (IEEE) 802.3x) and priority pause (IEEE 802.1Qbb) can be used to substantially prevent buffer overflow in some applications, and quantized congestion notification (QCN) (IEEE 802.1Qau) can be used for management of data congestion within a multi-hop network that has relatively steady data flows. These known flow control protocols, however, may not adequately resolve congestion issues related to multi-stage queues and/or may not adequately handle the rapid onset of congestion within a hop-by-hop network link caused by, for example, bursts of data.

Thus, a need exists for methods and apparatus for data flow control between modules associated with a hop-by-hop network link.

SUMMARY OF THE INVENTION

A system includes a module associated with a first stage of a switch fabric directly coupled to a module associated with a second stage of the switch fabric via a single physical hop having multiple virtual channels. The module associated with the first stage is configured to assign a virtual channel identifier associated with a virtual channel with a data packet using a hash function and to send the data packet through the virtual channel based on the virtual channel identifier. The module associated with the second stage is configured to send a flow control signal to the module associated with the first stage when an available capacity of a queue is less than a predetermined threshold. The module associated with the first stage is configured to suspend sending data packets via the virtual channel in response to the flow control signal.

DETAILED DESCRIPTION

Figure 1:
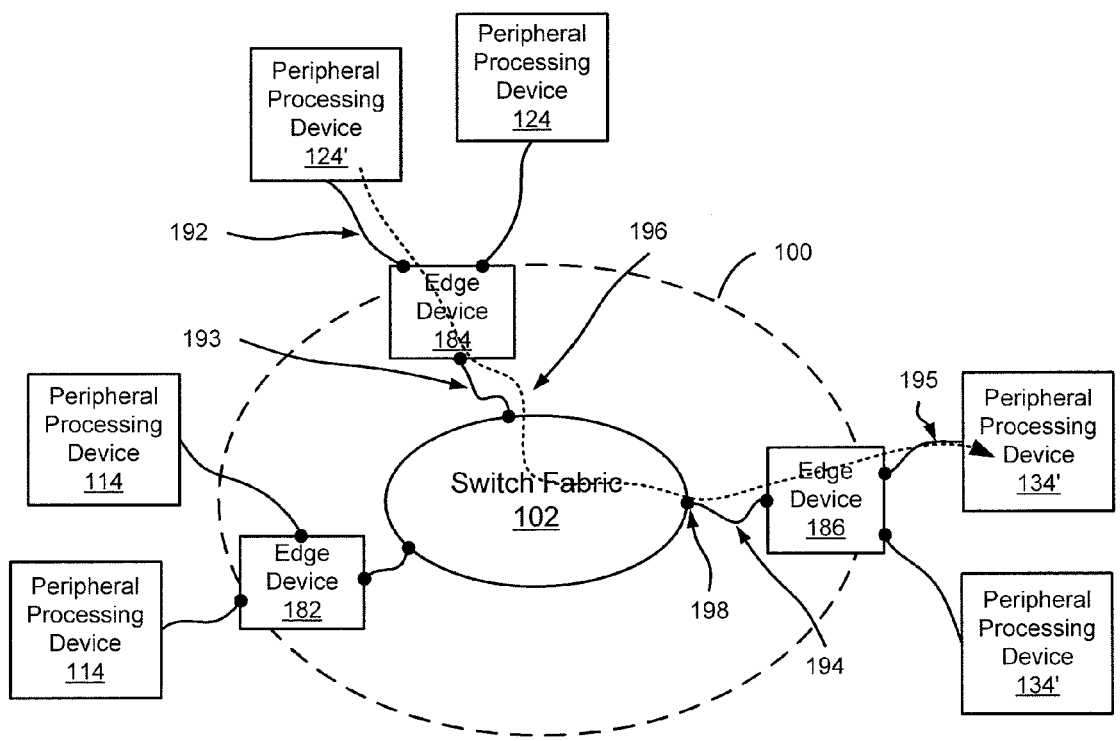
FIG. 1 is a system block diagram of a switch fabric system, according to an embodiment.

In some embodiments, a system includes a module associated with a first stage of a switch fabric directly coupled to a module associated with a second stage of the switch fabric via a single physical hop having multiple virtual channels. The module associated with the first stage is configured to assign a virtual channel identifier associated with a virtual channel with a data packet using a hash function and to send the data packet through the virtual channel based on the virtual channel identifier. The module associated with the second stage is configured to send a flow control signal to the module associated with the first stage when an available capacity of a queue is less than a predetermined threshold. The module associated with the first stage is configured to suspend sending data packets via the virtual channel in response to the flow control signal.

Having multiple virtual channels associated with a single physical hop allows a module to suspend a congested virtual channel while allowing the remaining virtual channels to transmit data packets. As a result, the physical hop can reduce the flow of data associated with a congested virtual channel without completely preventing data from being sent via the physical hop.

In some embodiments, a system includes a first switch stage of a switch fabric and a second switch stage of the switch fabric operatively coupled to the first switch stage via a set of virtual channels. The first switch stage has a set of output queues and associates incoming data with an output queue from the set of output queues based on a result of a hash function using a value of a header of the incoming data as an input. Each output queue from the set of output queues is associated with and configured to send data through a virtual channel from the set of virtual channels associated with a single physical hop. The set of output queues is configured to alternate sending data through the set of virtual channels based on a schedule. The second switch stage has a set of input queues. Each input queue from the set of input queues is associated with a virtual channel from the set of virtual channels and has a capacity threshold. The second switch stage is configured to send a flow control signal to an output queue associated with a virtual channel from the set of virtual channels if an available capacity of the input queue associated with that virtual channel is less than its capacity threshold. The first switch stage is configured to remove the output queue from the schedule in response to receiving the flow control signal. In some embodiments, the schedule can include a round robin schedule, a priority-based schedule, a random schedule, a capacity-based schedule and/or any other type of schedule.

In some embodiments, a system includes a module associated with a first stage of a switch fabric, a module associated with a second stage of the switch fabric and a module associated with a third stage of the switch fabric. The switch fabric is part of a single logical hop. The module associated with the first stage is configured to assign data packets to virtual channels from a first set of virtual channels based on a first hash function. The first set of virtual channels is associated with a first single physical hop and the module associated with the first stage is configured to alternate sending data through each virtual channel from the first set of virtual channels based on a first schedule. The module associated with the second stage is configured to receive data packets from the first set of virtual channels and to assign the data packets to virtual channels from a second set of virtual channels based on a second hash function. The second set of virtual channels are associated with a second single physical hop and the module associated with the second stage is configured to alternate sending data through each virtual channel from the second set of virtual channels based on a second schedule. The module associated with the third stage configured to receive data packets from the second set of virtual channels.

As used herein, the term "physical hop" can include a physical link between two modules and/or devices. For example, a data path operatively coupling a first module with a second module can be said to be a physical hop. Similarly stated, a physical hop can physically link the first module with the second module.

As used herein, the term "single physical hop" can include a direct physical connection between two modules in a system. Similarly stated, a single physical hop can include a link via which two modules are coupled without intermediate modules. Accordingly, for example, if a first module is coupled to a second module via a single physical hop, the first module can send data packets directly to the second module without sending the data packets through intervening modules.

As used herein, the term "single logical hop" means a physical hop and/or group of physical hops that are a single hop within a network topology associated with a first protocol. Similarly stated, according to the topology associated with the first protocol, no intervening nodes exist between a first module and/or device operatively coupled to a second module and/or device via the physical hop and/or the group of physical hops. A first module and/or device connected to a second module and/or device via a single logical hop can send a data packet to the second module and/or device using a destination address associated with the first protocol and the second module and/or device, regardless of the number of physical hops between the first device and the second device. In some embodiments, for example, a second protocol can use the destination address of the first protocol to route a data packet and/or cell from the first module and/or device to the second module and/or device over the single logical hop. Similarly stated, when a first module and/or device sends data to a second module and/or device via a single logical hop of a first protocol, the first module and/or device treats the single logical hop as if it is sending the data directly to the second module and/or device.

In some embodiments, a switch fabric can function as part of a single logical hop (e.g., a single large-scale consolidated L2/L3 switch). Portions of the switch fabric can be physically distributed across, for example, many chassis and/or modules interconnected by multiple physical hops. In some embodiments, for example, a processing stage of the switch fabric can be included in a first chassis and another processing stage of the switch fabric can be included in a second chassis. Both of the processing stages can logically function as part of a single consolidated switch (e.g., within the same logical hop according to a first protocol) but include a separate single physical hop between respective pairs of processing stages. Similarly stated, a physical hop can operatively couple each stage within a switch fabric representing a single logical hop associated with a protocol used to route data outside the switch fabric. Additionally, packet classification and forwarding associated with a protocol used to route data outside a single logical hop need not occur at each stage within the single logical hop. In some embodiments, for example, packet classification and forwarding associated with a first protocol (e.g., Ethernet) can occur prior to a module and/or device sending the data packet to another module and/or device via the single logical hop.

As used herein, a module that is within a switch fabric can be, for example, any assembly and/or set of operatively-coupled electrical components that define one or more switches within a stage of a switch fabric. In some embodiments, a module can include, for example, a memory, a processor, electrical traces, optical connectors, and/or the like.

As used herein, "associated with" can mean, for example, included in, physically located with, a part of, and/or operates or functions as a part of. For example, a module associated with a first stage of a switch fabric can be said to be included in, physically located with or a part of the first stage of the switch fabric. A module associated with a first stage of a switch fabric can also be said to operate or function as a part of the first stage of the switch fabric. Additionally, "associated with" can mean, for example, references, identifies, characterizes, describes, and/or sent from. For example, an identifier associated with a virtual channel can be an identifier that identifies, references and/or relates to the virtual channel.

As used in this specification, the singular forms "a," "an" and "the" include plural referents unless the context clearly dictates otherwise. Thus, for example, the term "a switch fabric" is intended to mean a single switch fabric or a combination of switch fabrics.

The terms "first stage", "second stage" and so on refer to portions, modules or nodes within a switch fabric. In some instances, these terms refer to a specific stage within a given switch fabric. For example, a three-stage Clos network includes three consecutive stages from ingress to egress; such a switch fabric has three stages that can be referred to as the "first stage" (the first stage with respect to the ingress to egress direction) through the third stage (the third and final stage with respect to the ingress to egress direction). For example, FIGS. 2 and 4 refer to specific stages within a given switch fabric. In other instances, however, the terms "first stage", "second stage" and so on refer to any stage within the switch fabric and correspond to the order of discussion of a given stage. For example, the "first stage" can refer to the first stage discussed and can correspond to any stage within the switch fabric (e.g., the third stage within a three-stage Clos network), and the "second stage" can refer to a remaining stage within the switch fabric (e.g., the second stage within the three-stage Clos network). Thus, it should be understood that the specific context will indicate whether the terms "first stage", "second stage" and so on can refer to a specific ordinal stage within a switch fabric or can refer to any particular stage within the switch fabric.

FIG. 1 is a schematic diagram that illustrates a switch fabric system 100, according to an embodiment. The switch fabric system 100 includes a switch fabric 102 and multiple edge devices 182, 184, 186. The switch fabric system 100 operatively couples multiple peripheral processing devices 114, 124, 134 to each other. The peripheral processing devices 114, 124, 134 can be, for example, compute nodes, service nodes, routers, and storage nodes, as described in further detail herein. In some embodiments, for example, the peripheral processing devices 114, 124, 134 include servers, storage devices, gateways, workstations, and/or the like.

The peripheral processing devices 114, 124, 134 can be operatively coupled to the edge devices 182, 184, 186 of the switch fabric system 100 using any suitable connection such as, for example, an optical connection (e.g., an optical cable and optical connectors), an electrical connection (e.g., an electrical cable and electrical connectors) and/or the like. As such, the peripheral processing devices 114, 124, 134 are configured to send data (e.g., data packets, data cells, etc.) to the switch fabric system 100 via the edge devices 182, 184, 186. In some embodiments, the connection between the peripheral processing devices 114, 124, 134 and the edge devices 182, 184, 186 is a direct link. Such a link can be said to be a single physical hop link. In other embodiments, the peripheral processing devices can be operatively coupled to the edge devices via intermediate modules. Such a connection can be said to be a multiple physical hop link.

Each edge device 182, 184, 186 can be any device configured to operatively couple peripheral processing devices 114, 124, 134 to the switch fabric 102. In some embodiments, for example, the edge devices 182, 184, 186 can be access switches, input/output modules, top-of-rack devices and/or the like. Structurally, the edge devices 182, 184, 186 can function as both source edge devices and destination edge devices. Accordingly, the edge devices 182, 184, 186 can send data (e.g., a data stream of data packets and/or data cells) to and receive data from the switch fabric 102, and to and from the connected peripheral processing devices 114, 124, 134.

In some embodiments, the edge devices 182, 184, 186 can be a combination of hardware modules and software modules. In some embodiments, for example, each edge device 182, 184, 186 can include a field-programmable gate array (FPGA), an application specific integrated circuit (ASIC), a digital signal processor (DSP) and/or the like.

The edge devices 182, 184, 186 can be configured to prepare a data packet (e.g., an Ethernet packet) to enter the switch fabric 102. For example, the edge devices 182, 184, 186 can be configured to forward, classify, and/or modify the packet encapsulation (e.g., modify, add and/or remove a header portion, footer portion and/or any other identifier included within the data packet) of a data packet prior to sending the data packet to the switch fabric 102. Additional details related to packet classification are described in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

Each of the edge devices 182, 184, 186 is configured to communicate with the other edge devices 182, 184, 186 via the switch fabric 102. Specifically, the switch fabric 102 is configured to provide any-to-any connectivity between the edge devices 182, 184, 186 at relatively low latency. For example, switch fabric 102 can be configured to transmit (e.g., convey) data between edge devices 182, 184, 186. In some embodiments, the switch fabric 102 can have at least hundreds or thousands of ports (e.g., egress ports and/or ingress ports) through which edge devices 182, 184, 186 can transmit and/or receive data.

The edge devices 182, 184, 186 can include one or more network interface devices (e.g., a 40 Gigabit (Gb) Ethernet interface, a 100 Gb Ethernet interface, etc.) through which the edge devices 182, 184, 186 can send signals to and/or receive signals from the switch fabric 102. The signals can be sent to and/or received from the switch fabric 102 via an electrical link, an optical link and/or a wireless link operatively coupled to the edge devices 182, 184, 186. In some embodiments, the edge devices 182, 184, 186 can be configured to send signals to and/or receive signals from the switch fabric 102 based on one or more protocols (e.g., an Ethernet protocol, a multi-protocol label switching (MPLS) protocol, a fibre channel protocol, a fibre-channel-over Ethernet protocol, an Infiniband-related protocol).

The switch fabric 102 can be any suitable switch fabric that operatively couples the edge devices 182, 184, 186 to the other edge devices 182, 184, 186. In some embodiments, for example, the switch fabric 102 can be a Clos network (e.g., a non-blocking Clos network, a strict sense non-blocking Clos network, a Benes network) having multiple stages of switching modules (e.g., integrated Ethernet switches). In some embodiments, for example, the switch fabric 102 can be similar to the three-stage switch fabric 200 shown in FIG. 2 and described in further detail herein. In other embodiments, the switch fabric 102 shown in FIG. 1 can include any number of stages. In such embodiments, for example, the switch fabric 102 can include five, seven or nine stages. The switch fabric 102 can be, for example, part of a core portion of a data center similar to the core portion of the data center described in co-pending U.S. patent application Ser. No. 12/495,337, filed Jun. 30, 2009, and entitled "Methods and Apparatus Related to Any-to-Any Connectivity Within a Data Center," which is incorporated herein by reference in its entirety.

In some embodiments, the switch fabric 102 can be (e.g., can function as) a single consolidated switch (e.g., a single large-scale consolidated L2/L3 switch). In other words, the switch fabric 102 can be configured to operate as a single logical entity (e.g., a single logical network element). Similarly stated, the switch fabric 102 can be part of a single logical hop between a first edge device 182, 184, 186 and a second edge device 182, 184, 186 (e.g., along with the data paths between the edge devices 182, 184, 186 and the switch fabric 102). The switch fabric 102 can be configured to connect (e.g., facilitate communication between) the peripheral processing devices 114, 124, 134. In some embodiments, the switch fabric 102 can be configured to communicate via interface devices (not shown) configured to transmit data at a rate of at least 10 Gb/s. In some embodiments, the switch fabric 102 can be configured to communicate via interface devices (e.g., fibre-channel interface devices) configured to transmit data at a rate of, for example, 2 Gb/s, 4, Gb/s, 8 Gb/s, 10 Gb/s, 40 Gb/s, 100 Gb/s and/or faster link speeds.

Although the switch fabric 102 can be logically centralized, the implementation of the switch fabric 102 can be highly distributed, for example, for reliability. For example, portions of the switch fabric 102 can be physically distributed across, for example, many chassis. In some embodiments, for example, a processing stage of the switch fabric 102 can be included in a first chassis and another processing stage of the switch fabric 102 can be included in a second chassis. Both of the processing stages can logically function as part of a single consolidated switch (e.g., within the same logical hop) but have a separate single physical hop between respective pairs of processing stages. More details related to architecture of the switch fabric 102 are described herein.

In use, a data packet (e.g., an Ethernet packet) can be sent between peripheral processing devices 114, 124, 134 via the switch fabric system 100. For example, a data packet can be sent from a first peripheral processing device 124' to a second peripheral processing device 134' via path 196. The first peripheral processing device 124' can send the data packet to the edge device 184 via link 192 using a first protocol (e.g., Ethernet). The edge device 184 can then prepare the data packet to enter the switch fabric 102 (e.g., based on a second protocol). Once prepared, the edge device 184 sends the data packet to the switch fabric 102 via link 193. The switching modules within the switch fabric 102 can route the data packets through the switch fabric 102 according to the second protocol. The data packet is sent through port 198 to the edge device 186 via link 194. The edge device 186 can then send the data packet to the second peripheral processing device 134' via link 195 using the first protocol.

Figure 2:
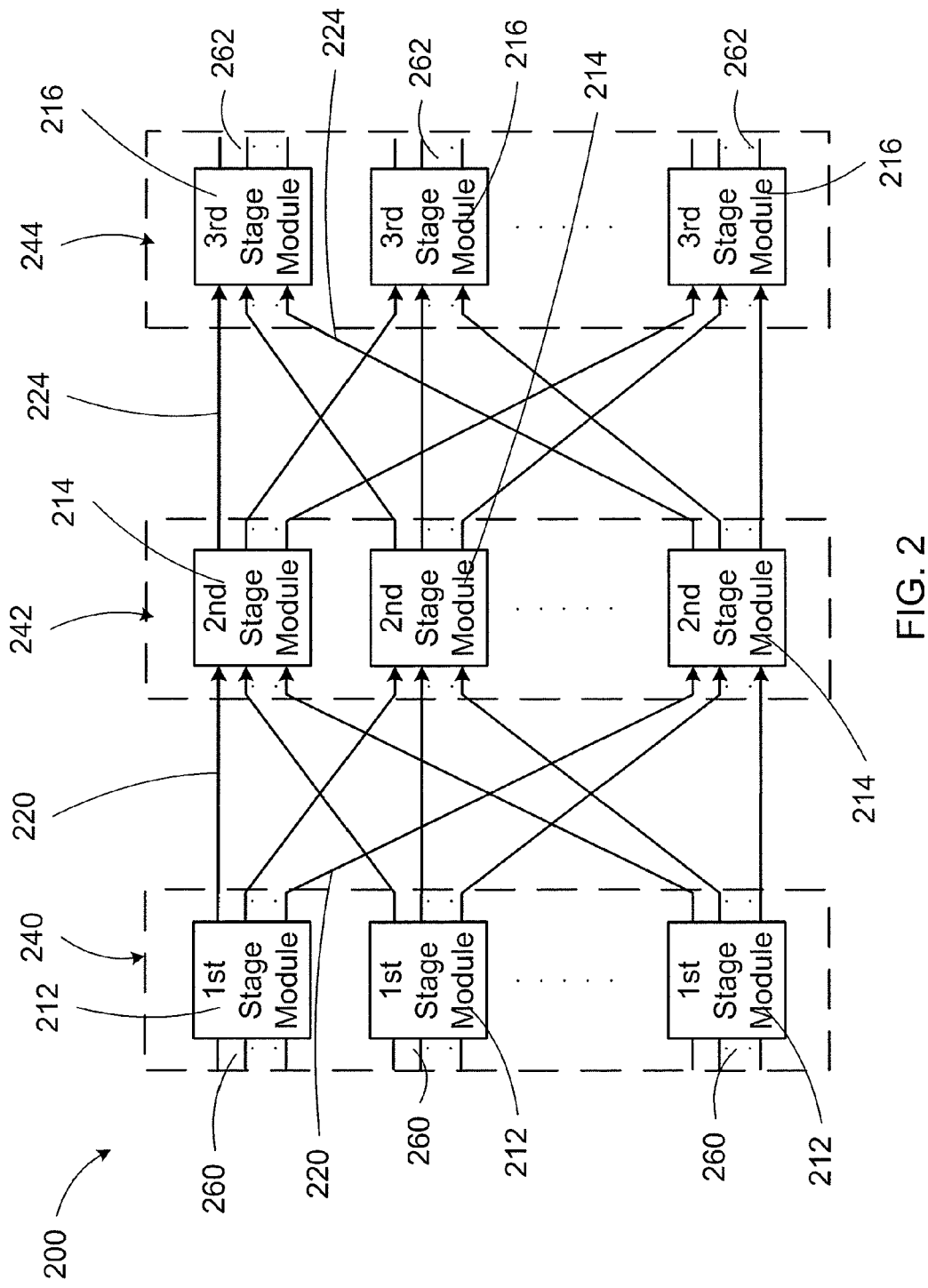
FIG. 2 is a schematic illustration of a switch fabric, according to another embodiment.

FIG. 2 is a schematic illustration of a switch fabric 200, according to an embodiment. The switch fabric 200 can include multiple physical hops that are within a single logical hop. Switch fabric 200 is a three-stage, non-blocking Clos network and includes a first stage 240, a second stage 242, and a third stage 244. The first stage 240 includes modules 212. Each module 212 of the first stage 240 is an assembly of electronic components and circuitry. In some embodiments, for example, each module is an application-specific integrated circuit (ASIC). In other embodiments, multiple modules are contained on a single ASIC or a single chip package. In still other embodiments, each module is an assembly of discrete electrical components.

In some embodiments, each module 212 of the first stage 240 is a switch (e.g., a packet switch, a frame switch, an integrated Ethernet switch and/or a cell switch). The switches are configured to redirect data (e.g., data packets, data cells, etc.) as it flows through the switch fabric 200. In some embodiments, for example, each switch includes multiple input ports operatively coupled to write interfaces on a memory buffer (not shown in FIG. 2). Similarly, a set of output ports are operatively coupled to read interfaces on the memory buffer. In some embodiments, the memory buffer can be a shared memory buffer implemented using on-chip static random access memory (SRAM) to provide sufficient bandwidth for all input ports to write one incoming cell (e.g., a portion of a data packet) or data packet per time period (e.g., one or more clock cycles) and all output ports to read one outgoing cell or data packet per time period. Each switch operates similar to a crossbar switch that can be reconfigured subsequent each time period.

Each module 212 of the first stage 240 includes a set of input ports 260 configured to receive data (e.g., a signal, a cell of a packet, a data packet, etc.) as it enters the switch fabric 200. In this embodiment, each module 212 of the first stage 240 includes the same number of input ports 260.

Similar to the first stage 240, the second stage 242 of the switch fabric 200 includes modules 214. The modules 214 of the second stage 242 are structurally similar to the modules 212 of the first stage 240. Each module 214 of the second stage 242 is operatively coupled to each module 212 of the first stage 240 by a data path 220. Each data path 220 between a given module 212 of the first stage 240 and a given module 214 of the second stage 242 is configured to facilitate data transfer from the modules 212 of the first stage 240 to the modules 214 of the second stage 242.

The data paths 220 between the modules 212 of the first stage 240 and the modules 214 of the second stage 242 can be constructed in any manner configured to facilitate data transfer from the modules 212 of the first stage 240 to the modules 214 of the second stage 242. In some embodiments, for example, the data paths 220 are optical connectors between the modules. In other embodiments, the data paths are within a midplane. Such a midplane can be similar to that described in U.S. application Ser. No. 12/345,500, filed Dec. 29, 2008, and entitled "System Architecture for a Scalable and Distributed Multi-Stage Switch Fabric," which is incorporated herein by reference in its entirety. Such a midplane can be used to connect each module of the second stage with each module of the first stage. In still other embodiments, two or more modules are contained within a single chip package and the data paths are electrical traces.

In some embodiments, the switch fabric 200 is a non-blocking Clos network. Thus, the number of modules 214 of the second stage 242 of the switch fabric 200 varies based on the number of input ports 260 of each module 212 of the first stage 240. In a rearrangeably non-blocking Clos network (e.g., a Benes network), the number of modules 214 of the second stage 242 is greater than or equal to the number of input ports 260 of each module 212 of the first stage 240. Thus, if n is the number of input ports 260 of each module 212 of the first stage 240 and m is the number of modules 214 of the second stage 242, m≥n. In some embodiments, for example, each module of the first stage has five input ports. Thus, the second stage has at least five modules. All five modules of the first stage are operatively coupled to all five modules of the second stage by data paths. Said another way, each module of the first stage can send data to any module of the second stage.

The third stage 244 of the switch fabric 200 includes modules 216. The modules 216 of the third stage 244 are structurally similar to the modules 212 of the first stage 240. The number of modules 216 of the third stage 244 is typically equivalent to the number of modules 212 of the first stage 240. Each module 216 of the third stage 244 includes output ports 262 configured to allow data to exit the switch fabric 200. Each module 216 of the third stage 244 includes the same number of output ports 262. Further, the number of output ports 262 of each module 216 of the third stage 244 is typically equivalent to the number of input ports 260 of each module 212 of the first stage 240.

Each module 216 of the third stage 244 is connected to each module 214 of the second stage 242 by a data path 224. The data paths 224 between the modules 214 of the second stage 242 and the modules 216 of the third stage 244 are configured to facilitate data transfer from the modules 214 of the second stage 242 to the modules 216 of the third stage 244.

The data paths 224 between the modules 214 of the second stage 242 and the modules 216 of the third stage 244 can be constructed in any manner configured to facilitate data transfer from the modules 214 of the second stage 242 to the modules 216 of the third stage 244. In some embodiments, for example, the data paths 224 are optical connectors between the modules. In other embodiments, the data paths are within a midplane. Such a midplane can be used to connect each module of the second stage with each module of the third stage. In still other embodiments, two or more modules are contained within a single chip package and the data paths are electrical traces.

Figure 3:
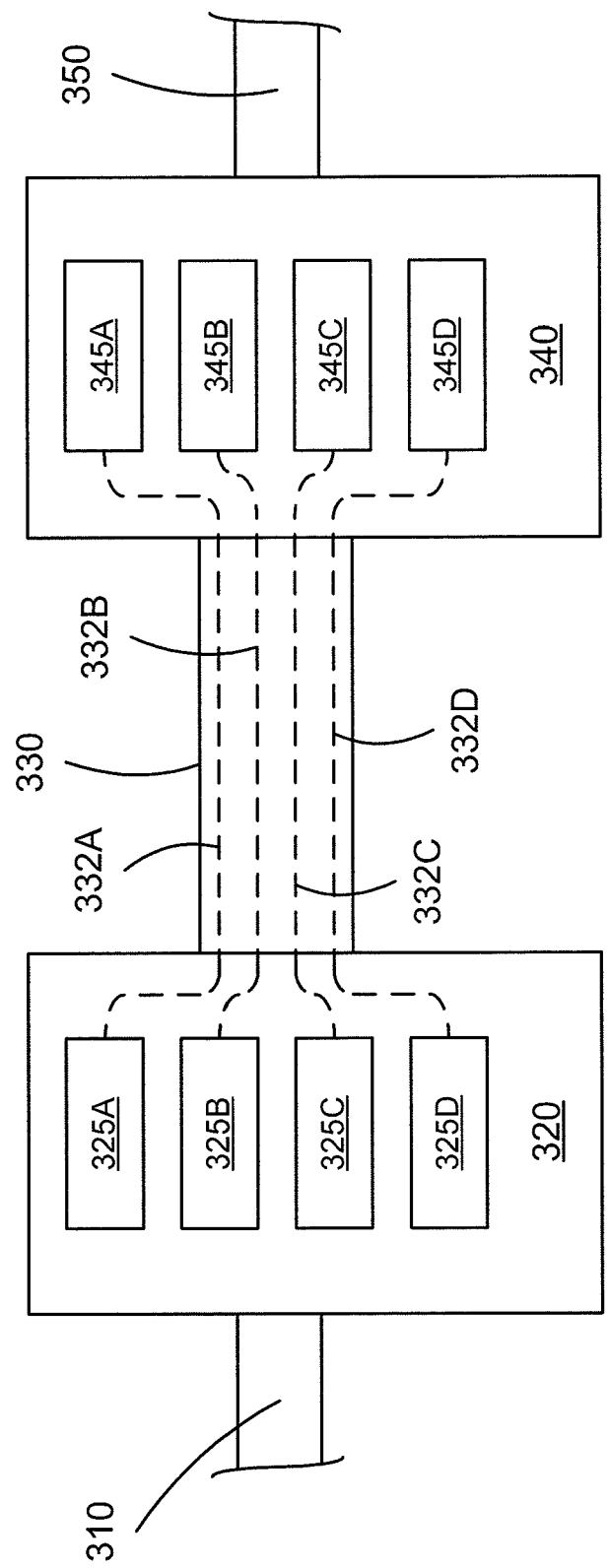
FIG. 3 is a schematic illustration of a physical hop between two modules in a switch fabric, according to another embodiment.

In some embodiments, the data paths 220 between the modules 212 of the first stage 240 and the modules 214 of the second stage 242, and the data paths between the modules 214 of the second stage 242 and the modules 216 of the third stage 244, can include multiple virtual channels. For example, FIG. 3 illustrates a link 330 between a first module 320 and a second module 340 having virtual channels 332A, 332B, 332C, 332D. The link 330 can be said to be a single physical hop between the first module 320 and the second module 340. In some embodiments, the first module 320, the second module 340 and the link 330 can be within and/or a part of a switch fabric that is part of a single logical hop, similar to switch fabric 200 shown and described above with respect to FIG. 2.

As shown in FIG. 3, the first module 320 can be similar to the modules 212 of the first stage 240 and/or the modules 214 of the second stage 242, described above. More particularly, the first module 320 can be associated with a stage within a switch fabric that is not the final and/or egress stage of the switch fabric. Accordingly, if the first module 320 is within a switch fabric having three-stages, the first module 320 can be associated with a first stage or a second stage of the switch fabric. Similarly, if the first module 320 is within a switch fabric having five-stages, the first module 320 can be associated with a first stage, a second stage, a third stage or a fourth stage of the switch fabric.

The first module 320 includes an input 310 and multiple queues 325A, 325B, 325C, 325D. The input 310 can be any type of optical and/or electrical connector and can operatively couple the first module 320 to an edge device or another module within the switch fabric. In some embodiments, the input 310 can operatively couple the first module 320 to a module and/or an edge device upstream from the first module 320. For example, if the first module 320 is associated with a first stage of the switch fabric, the input 310 can operatively couple the first module 320 to an edge device. For another example, if the first module 320 is associated with a second stage of the switch fabric, the input 310 can operatively couple the first module 320 to a module associated with a first stage of the switch fabric.

The queues 325A, 325B, 325C, 325D can be part of any suitable memory configured to store data packets prior to being sent via the link 330. In some embodiments, for example, the queues 325A, 325B, 325C, 325D can be part of a single shared memory. In such embodiments, each queue 325A, 325B, 325C, 325D can be assigned, allocated and/or associated with a portion of the shared memory. Similarly stated, in such embodiments, a portion of the shared memory can be allocated and/or partitioned for each queue 325A, 325B, 325C, 325D.

As discussed in further detail herein, the first module 320 can be configured to assign incoming data packets received via the input 310 to a queue 325A, 325B, 325C, 325D. The first module 320 can use any suitable method to assign and store each data packet in a queue 325A, 325B, 325C, 325D. For example, the first module 320 can assign each data packet to a queue 325A, 325B, 325C, 325D randomly, based on the available capacity of each queue 325A, 325B, 325C, 325D, based on the results of a hash function, based on a look-up table, based on an indication from a central controller (not shown in FIG. 3) and/or using any other method. Such a hash function and/or look-up table can use as an input a header value such as, for example, a destination media access control (MAC) address, a destination internet protocol (IP) address, a source MAC address, a source IP address, a priority indicator, a protocol and/or any other suitable value. In some embodiments, for example, a look-up table and/or a hash function can associate each queue 325A, 325B, 325C, 325D with a range of IP and/or MAC addresses. In embodiments using a central controller, the central controller can monitor use and/or congestion of each virtual channel 332A, 332B, 332C, 332D and dynamically assign data packets to the virtual channels 332A, 332B, 332C, 332D to optimize the flow of traffic through the link 330.

Each queue 325A, 325B, 325C, 325D is uniquely associated with a virtual channel 332A, 332B, 332C, 332D. As such, each queue 325A, 325B, 325C, 325D is configured to send data through the link 330 using a corresponding virtual channel 332A, 332B, 332C, 332D. As shown in FIG. 3, for example, queue 325A is associated with virtual channel 332A, queue 325B is associated with virtual channel 332B, queue 325C is associated with virtual channel 332C and queue 325D is associated with virtual channel 332D. Accordingly, queue 325A is configured to send data packets through virtual channel 332A, queue 325B is configured to send data packets through virtual channel 332B, queue 325C is configured to send data packets through virtual channel 332C, and queue 325D is configured to send data packets through virtual channel 332D.

The virtual channels 332A, 332B, 332C, 332D are included within the link 330. The link 330 can be, for example, structurally and functionally similar to the data paths 220, 224 shown and described above with respect to FIG. 2. Accordingly, data packets and/or cells can be sent from the first module 320 to the second module 340.

The multiple virtual channels 332A, 332B, 332C, 332D share and/or each use the link 330 to convey and/or transfer data from the first module 320 to the second module 340. Because a single link 330 includes multiple virtual channels 332A, 332B, 332C, 332D, a single virtual channel 332A, 332B, 332C, 332D can send data to the second module 340 at a given time period. Said another way, at a single point in time, one virtual channel 332A, 332B, 332C, 332D can use the link 330.

A schedule can be used to schedule, order and/or prioritize which virtual channel 332A, 332B, 332C, 332D can use the link 330 during a given time period (e.g., a given clock cycle (s)). In some embodiments, for example, the schedule can be a round robin schedule. In such embodiments, each queue 325A, 325B, 325C, 325D sends data to the second module 340 sequentially. For example, queue 325A can send data to the second module 340 via the virtual channel 332A starting at a first clock cycle, queue 325B can send data to the second module 340 via the virtual channel 332B starting at a second clock cycle, queue 325C can send data to the second module 340 via the virtual channel 332C starting at a third clock cycle, queue 325D can send data to the second module 340 via the virtual channel 332D starting at a fourth clock cycle, queue 325A can send data to the second module 340 via the virtual channel 332A starting at a fifth clock cycle, and so on. Accordingly, a round robin schedule allocates the link 330 substantially equally between the virtual channels 332A, 332B, 332C, 332D. Similarly stated, a round robin schedule does not prioritize one queue 325A, 325B, 325C, 325D over another queue 325A, 325B, 325C, 325D.

In other embodiments, the schedule can be a priority-based schedule. In such embodiments, the queue 325A, 325B, 325C, 325D storing the highest priority data packets can be prioritized over the other queues 325A, 325B, 325C, 325D. For example, if queue 325A is designated as a high priority queue and the other queues 325B, 325C, 325D are designated as low priority queues, the schedule can allocate more time to the virtual channel 332A (i.e., the virtual channel associated with the high priority queue). For example, if the schedule is a strict priority-based schedule, the queue 325A can send data via the virtual channel 332A until the queue 325A is empty. After the queue 325A is empty, the other queues 325B, 325C, 325D can send data via their respective virtual channels 332A, 332B, 332C, 332D based on a round robin schedule. Accordingly, a priority-based schedule prioritizes a high priority queue's use of the link 330.

In other embodiments, the schedule can be a capacity-based schedule. In such embodiments, the schedule prioritizes the queue 325A, 325B, 325C, 325D having the least amount of available capacity. Similarly stated, in such embodiments, the schedule prioritizes the queue 325A, 325B, 325C, 325D having the most congestion and/or having the highest likelihood of overflowing. For example, if queue 325A is 75% full, queue 325B is 50% full and queues 325C and 325D are 25% full, queue 325A would be prioritized over queues 325B, 325C and 325D, and queue 325B would be prioritized over queues 325C and 325D. As such, the schedule would allow queue 325A to send data to the second module 340 via the virtual channel 332A until another queue 325B, 325C, 325D has less available capacity.

In yet other embodiments, the schedule can be any other type of schedule and/or a combination of types of schedules. For example, in some embodiments, the queue 325A, 325B, 325C, 325D storing a data packet that has been within a queue 325A, 325B, 325C, 325D for the longest time can be prioritized. Such embodiments, can be said to have a first-in-first-out (FIFO) priority scheme. For another example, in other embodiments, a round robin schedule can be used until an available capacity of a queue 325A, 325B, 325C, 325D falls below a threshold. After the available capacity of a queue 325A, 325B, 325C, 325D falls below the threshold, a capacity-based schedule can be used until the available capacity of the queue 325A, 325B, 325C, 325D rises above the threshold. In such embodiments, the combination of the round robin and capacity-based schedules can be used to reduce the risk of overflow when a queue 325A, 325B, 325C, 325D is nearing capacity.

The second module 340 can be similar to the modules 214 of the second stage 242 and/or the modules 216 of the third stage 244, described above. More particularly, the second module 340 can be associated with a stage within a switch fabric that is not the initial and/or ingress stage of the switch fabric. Accordingly, if the second module 340 is within a switch fabric having three-stages, the second module 340 can be associated with a second stage or a third stage of the switch fabric. Similarly, if the second module 340 is within a switch fabric having five-stages, the second module 340 can be associated with a second stage, a third stage, a fourth stage or a fifth stage of the switch fabric.

The second module 340 includes an output 350 and multiple queues 345A, 345B, 345C, 345D. The output 350 can be any type of optical and/or electrical connector and can operatively couple the second module 340 with an edge device or another module within the switch fabric. In some embodiments, the output 350 can operatively couple the second module 340 with a module and/or an edge device downstream from the second module 340. For example, if the second module 340 is associated with a final stage of the switch fabric, the output 350 can operatively couple the second module 340 with an edge device. For another example, if the second module 340 is associated with a second stage of the switch fabric, the output 350 can operatively couple the second module 340 with a module associated with a third stage of the switch fabric.

The queues 345A, 345B, 345C, 345D can be part of any suitable memory configured to store data packets received from the link 330. In some embodiments, for example, the queues 345A, 345B, 345C, 345D can be part of a single shared memory. In such embodiments, each queue 345A, 345B, 345C, 345D can be assigned, allocated and/or associated with a portion of the shared memory. Similarly stated, in such embodiments, a portion of the shared memory can be allocated and/or partitioned for each queue 345A, 345B, 345C, 345D.

Similar to the queues 325A, 325B, 325C, 325D, each queue 345A, 345B, 345C, 345D is uniquely associated with a virtual channel 332A, 332B, 332C, 332D. As such, each queue 345A, 345B, 345C, 345D is configured to receive data from the link 330 using a corresponding virtual channel 332A, 332B, 332C, 332D. As shown in FIG. 3, for example, queue 345A is associated with virtual channel 332A, queue 345B is associated with virtual channel 332B, queue 345C is associated with virtual channel 332C and queue 345D is associated with virtual channel 332D. Accordingly, queue 345A is configured to receive data packets from virtual channel 332A, queue 345B is configured to receive data packets from virtual channel 332B, queue 345C is configured to receive data packets from virtual channel 332C, and queue 345D is configured to receive data packets from virtual channel 332D.

Each queue 345A, 345B, 345C, 345D is configured to buffer data packets prior to sending the data packets downstream via the output 350. Accordingly, as data packets are received from the queue 325A at the second module 340 via the virtual channel 332A, for example, the data packets are stored in the queue 345A prior to being sent via the output 350. Similarly, as data packets are received from the queues 325B, 325C, 325D at the second module 340 via the virtual channels 332B, 332C, 332D, respectively, the data packets are stored in the queues 345B, 345C, 345D, respectively, prior to being sent via the output 350.

Each queue 345A, 345B, 345C, 345D can include a capacity threshold. When an available capacity of a queue 345A, 345B, 345C, 345D falls below the capacity threshold, the second module 340 can initiate and/or define a flow control signal. Such a flow control signal can be sent to the first module 320. Upon receiving the flow control signal, the first module can suspend the queue 325A, 325B, 325C, 325D associated with the same virtual channel 332A, 332B, 332C, 332D as the initiating queue 345A, 345B, 345C, 345D from sending data packets to the second module 340. Similarly stated, the first module 320 can remove the queue 325A, 325B, 325C, 325D and/or the virtual channel 332A, 332B, 332C, 332D from the schedule, as described in further detail herein. Such a suspension can be for a predetermined time period and/or until the second module 340 sends a ready signal to the first module 320.

In some embodiments, the first module 320 can continue to assign data packets to a suspended queue 325A, 325B, 325C, 325D. In such embodiments, the suspended queue 325A, 325B, 325C, 325D can continue to store the data packets waiting to be sent via the virtual channel. Such data packets can be sent via the virtual channel after the suspended queue 325A, 325B, 325C, 325D is reinserted into the schedule. In other embodiments, the first module 320 can stop assigning data packets to a suspended queue 325A, 325B, 325C, 325D. In such embodiments, the first module 320 can instead assign data packets that otherwise would be assigned to the suspended queue 325A, 325B, 325C, 325D, to other queues 325A, 325B, 325C, 325D. This can add in reducing the congestion within the suspended queue 325A, 325B, 325C, 325D and its associated virtual channel.

In use, a data packet is received at the first module 320 via the input 310. The first module 320 assigns the data packet to a queue 325A, 325B, 325C, 325D using any suitable method, as described in further detail herein. The data packet is then stored in its assigned queue 325A, 325B, 325C, 325D.

The assigned queue 325A, 325B, 325C, 325D waits its turn to send the data packet to the second module 340 via its associated virtual channel 332A, 332B, 332C, 332D based on the schedule. After the schedule indicates that the assigned queue 325A, 325B, 325C, 325D can send the data packet, the data packet is sent to the second module 340 via the appropriate virtual channel 332A, 332B, 332C, 332D. For example, if the assigned queue is queue 325A, the data packet is sent to the second module 340 via the virtual channel 332A.

The data packet is received at the second module 340 and stored in the queue 345A, 345B, 345C, 345D corresponding to the virtual channel 332A, 332B, 332C, 332D via which the data packet was received. For example, if the second module 340 received the data packet on the virtual channel 332A, the second module 340 would store the data packet in the queue 345A. The queue 345A, 345B, 345C, 345D stores the data packet until it is the queue's 345A, 345B, 345C, 345D turn (e.g., based on another schedule) to send the data packet via the output 350.

If the data packet causes an available capacity of the queue 345A, 345B, 345C, 345D to fall and/or drop below a capacity threshold, the second module 340 can initiate and/or define a flow control signal. The second module 340 can send the flow control signal to the first module 320. In some embodiments, the second module 340 can send the flow control signal to the first module 320 via the link 330. In other embodiments, the second module 340 can send the flow control signal to the first module 320 via another link, such as, a dedicated flow control link (not shown in FIG. 3).

In response to receiving the flow control signal, the first modue 320 can suspend the queue 325A, 325B, 325C, 325D associated with the same virtual channel 332A, 332B, 332C, 332D as the initiating queue 345A, 345B, 345C, 345D from sending data packets to the second module 340. Similarly stated, the first module 320 can remove the queue 325A, 325B, 325C, 325D and/or the virtual channel 332A, 332B, 332C from the schedule. For example, if the data packet causes capacity of the queue 345A to exceed its capacity threshold, the flow control signal can cause the first module 320 to remove the queue 325A from the schedule. For example, if the schedule is a round robin schedule, the queues 325B, 325C and 325D would alternate sending data packets to the second module 340 while the queue 325A of the first module 320 is suspended. After a given time period and/or after the second module 340 sends an initiation signal to the first module 320, the queue 325A can be reinserted into the schedule. Accordingly, the queue 325A can resume sending data to the second module 340 based on the schedule.

Figure 4:
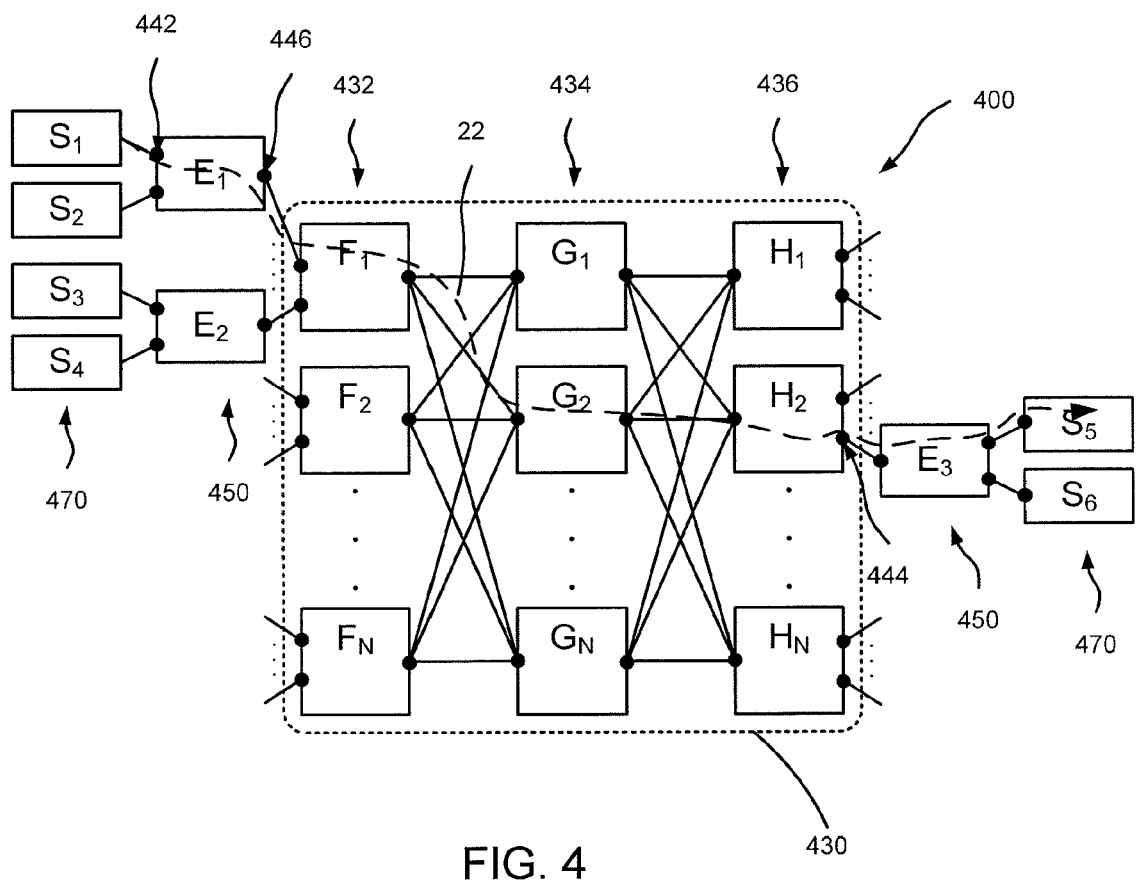
FIG. 4 is a system block diagram of a switch fabric system, according to another embodiment.

FIG. 4 is schematic illustration of a switch fabric system 400, according to another embodiment. The switch fabric system 400 includes a switch fabric 430, multiple edge devices 450 operatively coupled to the switch fabric 430, and multiple peripheral processing devices 470 operatively coupled to the edge devices 450. As described in further detail herein, a first peripheral processing device 470 (e.g., $S_1$) is configured to send a data packet to a second peripheral processing device 470 (e.g., $S_5$) via a first edge device 450 (e.g., $E_1$), the switch fabric 430, and a second edge device 450 (e.g., $E_3$).

The switch fabric 430 can be structurally and functionally similar to the switch fabric 200. Accordingly, the switch fabric includes modules $F_1$-$F_N$ associated with a first stage 432 of the switch fabric 430, modules $G_1$-$G_N$ associated with a second stage 434 of the switch fabric 430, and modules $H_1$-$H_N$ associated with a third stage 436 of the switch fabric. Each module $F_1$-$F_N$ associated with the first stage 432 is operatively coupled to each module $G_1$-$G_N$ associated with the second stage 434 via data paths. Similarly, each module $G_1$-$G_N$ associated with the second stage 434 is operatively coupled to each module $H_1$-$H_N$ associated with the third stage 436. The data paths between the modules $F_1$-$F_N$ associated with the first stage 432 and the modules $G_1$-$G_N$ associated with the second stage 434 and/or the data paths between the modules $G_1$-$G_N$ associated with the second stage 434 and the modules associated with the third stage 436 can be constructed in any manner configured to facilitate data transfer. In some embodiments, for example, the data paths include optical connectors, optical fibers and/or electrical connectors between the modules. In some embodiments, the data paths are within a midplane or a backplane.

Figure 5:
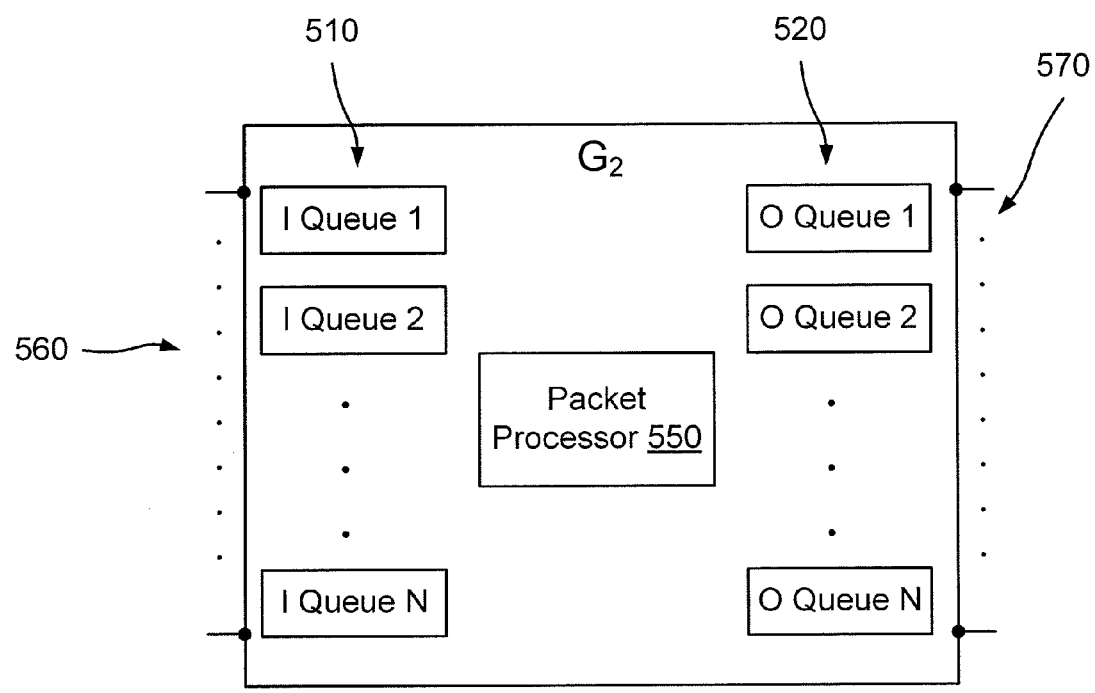
FIG. 5 is a schematic illustration of a module within a switch fabric, according to another embodiment.

FIG. 5 illustrates a module $G_2$ within the switch fabric. While the illustrated module $G_2$ is associated with the second stage 434 of the switch fabric 430 (see e.g., FIG. 4), the modules associated with the first stage 432 and the modules associated with the third stage 436 can be structurally and functionally similar to the module $G_2$ shown in FIG. 5. The module $G_2$ includes multiple input ports 560, multiple output ports 570, multiple input queues 510, multiple output queues 520 and a packet processor 550.

The input ports 560 can be any ports suitable to receive data packets from a module $F_1$-$F_N$ associated with the first stage 432 of the switch fabric 430. Accordingly, the input ports 560 can operatively couple the module $G_2$ with the modules $F_1$-$F_N$ associated with the first stage 432 via the data paths between the modules $F_1$-$F_N$ and the module $G_2$ (see FIG. 4). Similarly, the output ports 570 can be any ports suitable to send data packets to a module $H_1$-$H_N$ associated with the third stage 436 of the switch fabric 430. Accordingly, the output ports 570 can operatively couple the module $G_2$ with the modules $H_1$-$H_N$ associated with the third stage via the data paths between the modules $H_1$-$H_N$ and the module $G_2$.

The input queues 510 (I Queue 1 through I Queue N) can be part of any suitable memory configured to store data packets received from the input ports 560. In some embodiments, for example, the input queues 510 can be part of a single shared memory. In such embodiments, each input queue 510 can be assigned, allocated and/or associated with a portion of the shared memory. Similarly stated, in such embodiments, a portion of the shared memory can be allocated and/or partitioned for each input queue 510. Each input queue 510 is configured to buffer data packets prior to sending the data packets to the packet processor 550 for processing.

Similar to the queues 345A, 345B, 345C, 345D, each input queue 510 is associated with a virtual channel (not shown in FIG. 5). As such, each input queue 510 is configured to receive data from the input ports 560 via a virtual channel. In some embodiments, for example, each input port 560 is associated with multiple input queues 510. In such embodiments, each input port 560 includes multiple virtual channels each associated with an input queue 510. For example, an input port 560 operatively coupling the module $G_2$ with the module $F_1$ can be associated with multiple input queues and multiple virtual channels associated with the multiple input queues. Through the multiple virtual channels, the module $G_2$ can receive data packets from the module $F_1$. For example, I Queue 1 and I Queue 2 can be associated with the input port 560 operatively coupling the module $G_2$ with the module $F_1$. I Queue 1 can be associated with a first virtual channel included in part within the input port 560 and I Queue 2 can be associated with a second virtual channel included in part within the input port 560. Accordingly, I Queue 1 and I Queue 2 can receive and store data packets received from the module $F_1$ via their respective virtual channels according to a schedule (e.g., round robin, priority-based, capacity-based, etc.).

Figure 7:
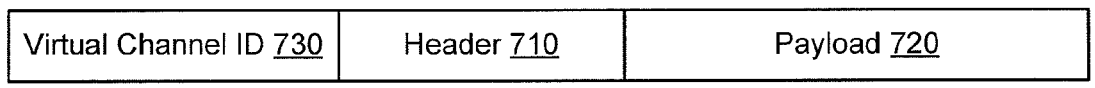
FIG. 7 is a schematic illustration of a data packet having a virtual channel identifier, according to another embodiment.

The module $G_2$ can determine and/or identify the virtual channel with which a data packet is associated, and thus the input queue 510 to which the data packet should be assigned, by parsing a virtual channel ID header appended to the data packet by the module $F_1$-$F_N$ associated with the first stage 432 sending the data packet. FIG. 7, for example, illustrates a data packet 700 having a virtual channel ID 730. The data packet also includes a payload 720 and a header 710. In some embodiments, for example, each data packet 700 having the same virtual channel ID 730 can be stored in the same input queue. As discussed above, and in further detail herein, the virtual channel ID 730 can be appended to the data packet 700 based on the header 710 and/or a portion of the header 710.

Each input queue 510 can include a capacity threshold. When an available capacity of an input queue 510 falls below the capacity threshold, the module $G_2$ can initiate and/or define a flow control signal. Such a flow control signal can be sent to the module associated with the first stage 432 associated with the input queue 510 having an available capacity less than the capacity threshold. For example, if I Queue 1 is associated with a virtual channel operatively coupling the module $F_1$ with the module $G_2$, the module $G_2$ can send flow control signals to the module $F_1$ when the available capacity of I Queue 1 falls below the capacity threshold.

Upon receiving the flow control signal, the module $F_1$-$F_N$ associated with the first stage 432 can suspend an output queue associated with the same virtual channel as the initiating input queue 510 from sending data packets to the module $G_2$. Similarly stated, the module $F_1$-$F_N$ associated with the first stage 432 can remove the output queue and/or the virtual channel associated with the same virtual channel as the initiating input queue 510 from a schedule, as described in further detail herein. For example, if the available capacity of I Queue 1 falls below the capacity threshold, the module $G_2$ can send a flow control signal to the module $F_1$. Such a flow control signal can cause the module $F_1$ to suspend sending data packets via the virtual channel associated with I Queue 1. Such a suspension can be for a predetermined time period and/or until the module $G_2$ sends a ready signal to the module $F_1$ associated with the first stage 432.

In some embodiments, the module $G_2$ can include a memory (not shown) containing a history of the flow control signals sent to the modules $F_1$-$F_N$ associated with the first stage 432. Such a history can include a time the flow control signal was sent, a suspension time period, a virtual channel identifier associated with the virtual channel to remove from the schedule, and/or any other information associated with the flow control signal. Maintaining a history can reduce the number of flow control signals sent between the modules by reducing and/or eliminating redundant flow control signals. For example, if the module $G_2$ sends a flow control signal to a module $F_1$-$F_N$ associated with the first stage 432 to suspend a particular virtual channel for 10 seconds, the history can ensure that the module $G_2$ does not send redundant and/or duplicative flow control signals to the module $F_1$-$F_N$ associated with the first stage 432 to suspend the particular virtual channel within the 10 second time period.

The output queues 520 (O Queue 1 through O Queue N) can be part of any suitable memory configured to store data packets received from the packet processor 550. In some embodiments, for example, the output queues 520 can be part of a single shared memory. In such embodiments, each output queue 520 can be assigned, allocated and/or associated with a portion of the shared memory. Similarly stated, in such embodiments, a portion of the shared memory can be allocated and/or partitioned for each output queue 520. Each output queue 520 is configured to buffer data packets prior to sending the data packets to a module $H_1$-$H_N$ associated with the third stage 436.

Similar to the queues 325A, 325B, 325C, 325D, each output queue 520 is associated with a virtual channel (not shown in FIG. 5). As such, each output queue 520 is configured to send data via the output ports 570 using a virtual channel. In some embodiments, each output port 570 is associated with multiple output queues 520. In such embodiments, each output port 570 includes multiple virtual channels each associated with an output queue 520. For example, an output port 570 operatively coupling the module $G_2$ with the module $H_2$ can be associated with multiple output queues and multiple virtual channels associated with the output queues. Through the multiple virtual channels, the module $G_2$ can send data packets to the module $H_2$. For example, O Queue 1 and O Queue 2 can be associated with the output port 570 operatively coupling the module $G_2$ with the module $H_2$. O Queue 1 can be associated with a first virtual channel and O Queue 2 can be associated with a second virtual channel, both included in part within the output port 570 operatively coupling the module $G_2$ with the module $H_2$. Accordingly, O Queue 1 and O Queue 2 can store data packets prior to sending the data packets to the module $H_2$ via their respective virtual channels according to a schedule (e.g., round robin, priority-based, capacity-based, etc.).

Similar to the input queues 510, each input queue associated with the modules $H_1$-$H_N$ can include a capacity threshold. For example, when an available capacity of an input queue associated with the module $H_2$ falls below the capacity threshold, the module $H_2$ can initiate and/or define a flow control signal. Such a flow control signal can be sent to the module $G_1$-$G_N$ associated with the second stage 434 associated with the input queue. For example, if O Queue 1 is associated with a virtual channel operatively coupling the module $H_2$ with the module $G_2$, the module $H_2$ can send flow control signals to the module $G_2$ when the available capacity of an input queue at $H_2$ associated with the virtual channel falls below the capacity threshold.

Upon receiving the flow control signal, the module $G_2$ can suspend an output queue 520 associated with the same virtual channel as the initiating input queue from sending data packets to the module $H_1$-$H_N$. Similarly stated, the module $G_2$ can remove the output queue 520 and/or the virtual channel associated with the output queue 520 from a schedule. For example, if the available capacity of an input queue associated with the same virtual channel as O Queue 1 falls below the capacity threshold, the module $H_2$ can send a flow control signal to the module $G_2$. Such a flow control signal can cause the module $G_2$ to suspend sending data packets via the virtual channel associated with O Queue 1. Similarly stated, O Queue 1 can be removed from the schedule associated with sending data via the physical link between module $G_2$ and module $H_2$. Such a suspension can be for a predetermined time period and/or until the module $H_1$-$H_N$ sends a ready signal to the module $G_2$ associated with the first stage 432.

The packet processor 550 can be any suitable processor configured to receive and/or read data packets from the input queues 510, process and/or route the data packets, and send and/or store the data packets to the output queues 520. For example, the packet processor 550 can receive a data packet received via the virtual channels operatively coupling the module $G_2$ with the modules $F_1$-$F_N$ associated with the first stage 432 from the input queues 510. Such a data packet can include a first virtual channel ID and can be similar to the data packet 700 of FIG. 7.

Figure 6:
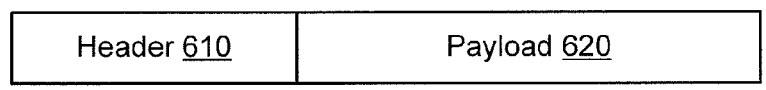
FIG. 6 is a schematic illustration of a data packet, according to an embodiment.

The packet processor 550 can remove a first virtual channel ID (e.g., similar to virtual channel ID 730) associated with a virtual channel operatively coupling the module $G_2$ with a module $F_1$-$F_N$ from the data packet (e.g., similar to data packet 700). After the first virtual channel ID has been removed, the data packet can have a structure similar to the data packet 600 of FIG. 6. The data packet 600 includes a header 610 and a payload 620. As discussed above, the header 610 can include identifying information associated with the data packet 600. In some embodiments, for example, the header 610 can include at least a portion of an IP 5-tuple. In such embodiments, for example, the header can include a destination MAC address, a destination IP address, a source MAC address, a source IP address and/or a transfer protocol. In other embodiments, the header can include any other identifying information associated with the data packet, such as, for example, a priority indicator.

The packet processor 550 can use the information within the header to assign the data packet to a virtual channel operatively coupling the module $G_2$ and a module $H_1$-$H_N$ associated with the third stage 436. For example, the packet processor 550 can assign the data packet to an output queue 520 randomly, based on the available capacity of each output queue 520, based on the results of a hash function, based on a look-up table, based on an indication from a central controller (not shown in FIGS. 4 and 5) and/or using any other method. Such a hash function and/or look-up table can use as an input a header value such as, for example, a destination MAC address, a destination IP address, a source MAC address, a source IP address, a priority indicator, a transfer protocol and/or any other suitable value. In some embodiments, for example, a look-up table and/or a hash function can associate each output queue 520 with a range of IP and/or MAC addresses. In embodiments using a central controller, the central controller can monitor use and/or congestion of each virtual channel and dynamically assign data packets to the virtual channels to optimize the flow of traffic through the switch fabric.

After the packet processor 550 assigns the data packet to an output queue 520, the packet processer 550 can append a second virtual channel ID (e.g., similar to virtual channel ID 730) to the data packet (e.g., similar to data packet 700). The second virtual channel ID can be associated with a virtual channel operatively coupling the module $G_2$ with a module $H_1$-$H_N$ associated with the third stage 436. Additionally the second virtual channel ID is associated with the output queue 520 to which the data packet is assigned. The packet processor 550 can then store the data packet in the assigned output queue 520.

Returning to FIG. 4, the peripheral processing devices 470 can be, for example, compute nodes, service nodes, routers, and storage nodes, as described in further detail herein. In some embodiments, for example, the peripheral processing devices 470 include servers, storage devices, gateways, workstations, and/or the like. The peripheral processing devices 470 can be operatively coupled to the edge devices 450 using any suitable connection such as, for example, an optical connection (e.g., an optical cable and optical connectors), an electrical connection (e.g., an electrical cable and electrical connectors) and/or the like. As such, the peripheral processing devices 470 are configured to send data (e.g., data packets, data cells, etc.) to the edge devices 450.

The edge devices 450 can be any devices configured to operatively couple peripheral processing devices 470 to the switch fabric 430. In some embodiments, for example, the edge devices 450 can be access switches, input/output modules, top-of-rack devices and/or the like. Edge devices $E_1$ and $E_2$ are schematically shown as source edge devices and edge device $E_3$ is schematically shown as a destination edge device for illustration purposes only. Structurally, the edge devices 450 (including $E_1$, $E_2$, and $E_3$) can function as source edge devices and destination edge devices. Accordingly, the edge devices 450 can send data to and receive data from the switch fabric 430.

While shown in FIG. 4 as being operatively coupled to a single module $F_1$ associated with the first stage 432, the edge device $E_1$ can be coupled to any number of modules associated with the first stage 432. Additionally, while shown in FIG. 4 as being operatively coupled to a single switch fabric 430, the edge device $E_1$ can be operatively coupled to any number of switch fabrics, similar to switch fabric 430. In some embodiments, for example, the edge device $E_1$ can be both coupled to the module $F_1$ associated with the first stage of the switch fabric 430 and a module associated with a first stage of a second switch fabric (not shown in FIG. 4). In such embodiments, the edge device $E_1$ can send data to either the module $F_1$ or the module associated with the first stage of the second switch fabric.

In some embodiments, the edge devices 450 can be configured to prepare a data packet to enter the switch fabric 430. For example, the edge devices 450 can be configured to forward, classify, and/or modify the packet encapsulation of a data packet prior to sending the data packet to the switch fabric 430. In some embodiments, for example, the edge devices 450 can append a source identifier (e.g., source MAC address, IP address, etc.), a destination identifier (e.g., source MAC address, IP address, etc.) and/or any other information to the data packet. Such information can be used to route the data packet through the switch fabric 430 (e.g., through virtual channels between the modules of the switch fabric).

In use, for example, a peripheral processing device $S_1$ can be configured to send a data packet to another peripheral processing device $S_5$. FIG. 4 represents the peripheral processing device $S_1$ sending a data packet to peripheral processing device $S_5$ by way of example. Any peripheral processing device 470 operatively coupled to the switch fabric 430 via an edge device 450 can be configured to send a data packet to any other peripheral processing device 470 coupled to the switch fabric 430 via an edge device 450.

The peripheral processing device $S_1$ can send the data packet to the edge device $E_1$ via port 442. In some embodiments, the data packet can include a payload and a header (e.g., FIG. 6). The payload can include data to be sent to peripheral processing device $S_5$. The header can include identifying information. In some embodiments, for example, the header can include at least a portion of an IP 5-tuple. In such embodiments, for example, the header can include a destination MAC address, a destination interne protocol (IP) address, a source MAC address, a source IP address and/or a transfer protocol identifier. In the present example, the destination MAC address and the destination IP address can be associated with peripheral processing device $S_5$, and the source MAC address and the source IP address can be associated with peripheral processing device $S_1$. Such information can be used in conjunction with a lookup table to route the data packet through the switch fabric 430 as shown and described in U.S. patent application Ser. No. 12/607,162, filed on Nov. 18, 2009, entitled "Methods and Apparatus Related to a Distributed Switch Fabric," which is incorporated herein by reference in its entirety. Using such source and destination specific information in conjunction with a lookup table to route data packets through the switch fabric 430 can ensure that each data packet originating from a particular source to be sent to a particular destination will be sent through the switch fabric 430 via the same path (e.g., through the same modules associated with each stage of the switch fabric 430). Similarly stated, the order of data packets sent through the switch fabric 430 from a first edge device 450 to a second edge device 450 is maintained.

Using the information contained within the header of the data packet, the edge device $E_1$ can determine to which module $F_1$-$F_N$ to send the data packet. In some embodiments, for example, the edge device $E_1$ can use a hash function using as inputs the destination MAC address, the destination IP address, the source MAC address, the source IP address, and/or the transfer protocol identifier to determine to which module $F_1$-$F_N$ to send the data packet.

After the module $F_1$ associated with the first stage 432 receives the data packet, the module $F_1$ determines to send the data packet to the module $G_2$ associated with the second stage 434. Additionally, the module $F_1$ can determine via which virtual channel between the module $F_1$ and the module $G_2$ to send the data packet to the module $G_2$. More specifically, a packet processor within the module $F_1$ can determine through which virtual channel (associated with a physical hop between the module $F_1$ and the module $G_2$) to send the data packet to the module $G_2$, append an associated first virtual channel ID to the data packet and store the data packet in an associated output queue at the module $F_1$. In some embodiments, for example, the module $F_1$ can use a hash function using as an input a destination identifier and/or a source identifier. Based on the inputs, the hash function can generate an identifier associated with a virtual channel associated with a module (e.g., module $G_2$) of the second stage 434 (e.g., the first virtual channel ID).

Based on and/or according to a schedule within the module $F_1$, the data packet can be sent to the module $G_2$ associated with the second stage 434. The module $G_2$ receives the data packet and, based on the first virtual channel ID, stores the data packet in an input queue (e.g., I Queue 1 in FIG. 5). The packet processor (e.g., packet processor 550 in FIG. 5) reads the first virtual channel ID from the data packet and determines to which module $H_2$ associated with the third stage 436 to send the data packet. Additionally, the module $G_2$ can determine via which virtual channel between the module $G_2$ and the module $H_2$ to send the data packet to the module $H_2$. More specifically, the packet processor 550 within the module $G_2$ can determine through which virtual channel (associated with a physical hop between the module $G_2$ and the module $H_2$) to send the data packet to the module $H_2$, append an associated second virtual channel ID to the data packet and store the data packet in an associated output queue (e.g., O Queue 1 in FIG. 5) at module $G_2$. In some embodiments, for example, the packet processor 550 within the module $G_2$ can use a hash function using as an input a destination identifier and/or a source identifier. Based on the inputs, the hash function can generate an identifier associated with a virtual channel associated with a module (e.g., module $H_2$) of the third stage 436 (e.g., the second virtual channel ID).

Based on and/or according to a schedule within the module G2, the data packet can be sent to the module $H_2$ associated with the third stage 436. The module $H_2$ receives the data packet and, based on the second virtual channel ID, stores the data packet in an input queue. The module $H_2$ can determine to which edge device (e.g., $E_3$) to send the data packet. More specifically, a packet processor at the module $H_2$ can read and/or receive the data packet from the input queue, remove the second virtual channel ID from the data packet, determine to which edge device (e.g., $E_3$) to send the data packet, and send the data packet accordingly. After the edge device $E_3$ receives the data packet, the edge device $E_3$ can determine to which peripheral processing device (e.g., $S_5$) to send the data packet and send the data packet accordingly.

As discussed above, if congestion occurs between any of the modules within the path 22 within the switch fabric (e.g., between the module $F_1$ and the module $G_2$ and/or between the module $G_2$ and the module $H_2$), the receiving module can send a flow control packet to the sending module to suspend sending data packets via a specific virtual channel. Based on the flow control signal, the output queue at the sending module can be removed from the schedule such that data is not sent via that particular virtual channel.

In some embodiments, the output queue is removed from the schedule for a specific suspension time period. In such embodiments, after the suspension time period has expired, the output queue is reinserted into the schedule and the sending module resumes sending data packets to the receiving module via the virtual channel. In other embodiments, a flow control packet can cause the sending module to suspend sending data packets to the receiving module via the virtual channel indefinitely. In such embodiments, the sending module suspends sending data packets until the sending module receives a second flow control signal and/or packet instructing the sending module to resume sending data packets to the receiving module via the virtual channel.

Figures 8, 9:
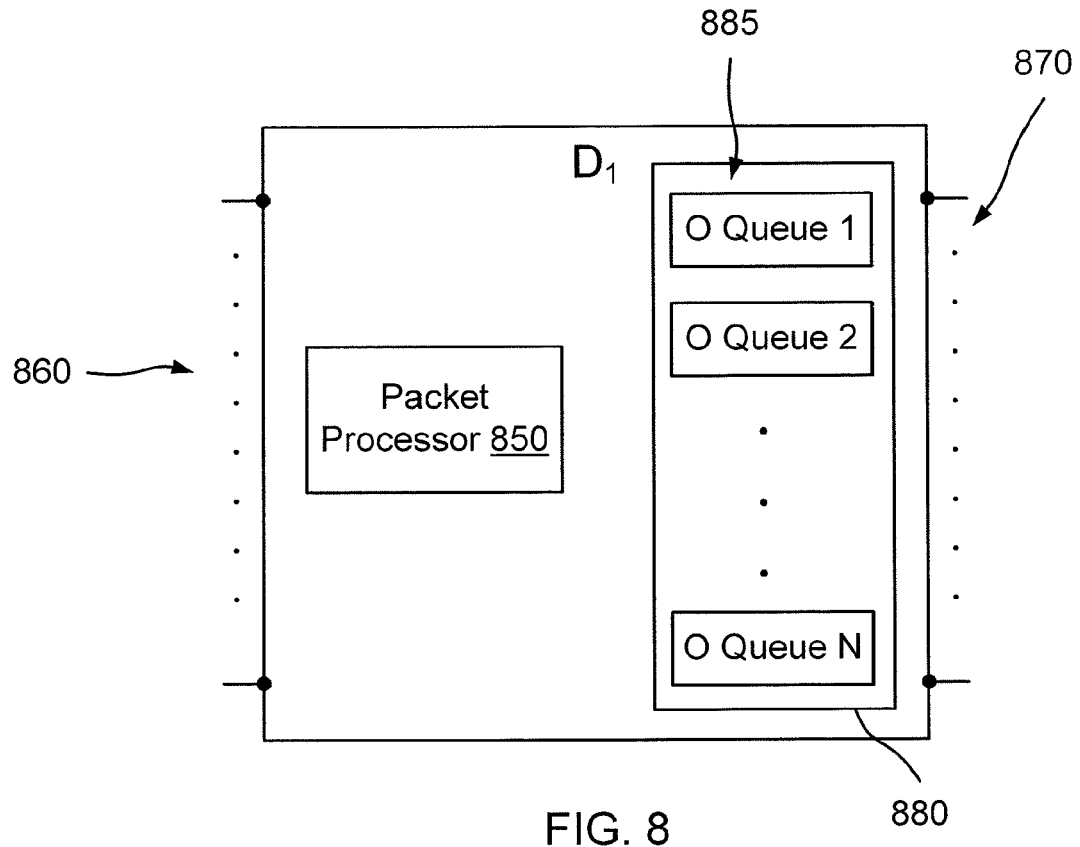
FIG. 8 is a schematic illustration of a module within a switch fabric, according to another embodiment.
FIG. 9 is a logical representation of a database stored at a module within a switch fabric, according to another embodiment.

While shown and described above as having both input queues and output queues (e.g., input queues 510 and output queues 520 of FIG. 5), in some embodiments each module of the switch fabric includes a single shared memory buffer partitioned to include multiple output queues. For example, FIG. 8 shows a module $D_1$ of a switch fabric (e.g., switch fabric 430 shown and described with respect to FIG. 4) having multiple input ports 860, multiple output ports 870, a shared memory buffer 880 and a packet processor 850. The module $D_1$ can be associated with any stage within the switch fabric. For example, the module $D_1$ can be similar to the module $F_1$ associated with the first stage 432 of the switch fabric 430, the module $G_1$ associated with the second stage 434 of the switch fabric 430 or the module $H_1$ associated with the third stage 436 of the switch fabric 430.

The input ports 860 and the output ports 870 can be similar to the input ports 560 and the output ports 570, shown and described above with respect to FIG. 5. Accordingly, via the input ports 860, the module $D_1$ can receive data from another module associated with the switch fabric or an edge device via virtual channels between the module $D_1$ and the other module. Similarly, via the output ports 870, the module $D_1$ can send data to another module associated with the switch fabric or an edge device via virtual channels between the module $D_1$ and that other module. Such virtual channels can be similar to the virtual channels shown and described above (e.g., virtual channels 332 of FIG. 3).

The shared memory buffer 880 can be implemented using on-chip static random access memory (SRAM) to provide sufficient bandwidth for the packet processor 850 to write one incoming cell (e.g., a portion of a data packet) or data packet per time period (e.g., one or more clock cycles), and all output ports 870 to read one outgoing cell or data packet per time period. The shared memory buffer 880 can be partitioned to include multiple output queues 885. In some embodiments, each virtual channel partially defined by the output ports 870 is associated with an output queue 885. As such, the data packets and/or cells to be sent via a virtual channel are stored and/or buffered in the output queue 885 associated with that virtual channel.

In some embodiments, the size of each output queue can be dynamic and/or variable. As such, based on the number of data packets and/or cells to be sent via a virtual channel, the output queue 885 associated with that virtual channel can expand or contract. For example, if, at a first time, the virtual channel associated with O Queue 1 has a greater number of data packets and/or cells buffered to be sent than the virtual channel associated with O Queue 2, the size of O Queue 1 can be greater than the size of O Queue 2. Similarly, if, at a second time, the virtual channel associated with O Queue 2 has a greater number of data packets and/or cells buffered to be sent than the virtual channel associated with O Queue 1, the size of O Queue 2 can be greater than the size of O Queue 1. Accordingly, the shared memory buffer 880 can be dynamically allocated based on the needs and/or requirements of the various output queues 885.

In some embodiments, each output queue 885 can have a maximum size. This ensures that a single output queue 885 does not use a large or unfair portion of the shared memory 880 at the expense of another output queue 885 that also uses the shared memory 880. In some embodiments, when a queue 885 exceeds its maximum size, a flow control signal can be sent to the module associated with one or more virtual channels through which data was sent to the module $D_1$ and subsequently assigned to the output queue 885 exceeding the threshold. Such a flow control signal can suspend the one or more virtual channels from sending data to the module $D_1$, thus reducing the number of data packets buffered in the queue 885. In some embodiments, each output queue 885 can also have a minimum size. Such a minimum size ensures that each output queue 885 can always handle a small number of data packets and/or cells.

The packet processor 850 can be any suitable processor configured to receive and/or read data packets from the input ports 860 (e.g., from a virtual channel), process and/or route the data packets, and send and/or store the data packets to the output queues 885. For example, the packet processor 850 can receive a data packet received via the virtual channels operatively coupling the module $D_1$ with another module via an input port 860. Such a data packet can include a first virtual channel ID and can be similar to the data packet 700 of FIG. 7.

Based on the virtual channel ID, the packet processor 850 can increment an input virtual channel counter stored in a database or represented in hardware. For example, as shown in FIG. 9, the packet processor 850 can store a database 900 including an input channel counter and a threshold for each input virtual channel. Accordingly, each time the packet processor 850 receives a data packet associated with a given input virtual channel via an input port 860, the associated input virtual channel counter is incremented and compared with the threshold. If the input virtual channel counter is greater than its associated threshold, a virtual channel flow control signal, similar to those shown and described above, can be sent to the module sending data to $D_1$ via the associated input virtual channel.

In some embodiments, after the data packet is removed from an output queue 885 and sent to another module via the output ports 870, the input virtual channel counter (i.e., within the database 900 of FIG. 9) associated with the input virtual channel via which the data packet was sent to the module $D_1$, can be decremented. Accordingly, each input virtual channel counter can maintain an accurate count of the number of data packets received via an associated input virtual channel (i.e., a virtual channel via which another module can send data to the module $D_1$) stored within the output queues 885.

The packet processor 850 can remove the first virtual channel ID (e.g., similar to virtual channel ID 730) associated with a virtual channel operatively coupling the module $D_1$ with another module from the data packet (e.g., similar to data packet 700). After the first virtual channel ID has been removed, the data packet can have a structure similar to the data packet 600 of FIG. 6. The data packet 600 includes a header 610 and a payload 620. As discussed above, the header 610 can include identifying information associated with the data packet 600. In some embodiments, for example, the header 610 can include at least a portion of an IP 5-tuple. In such embodiments, for example, the header can include a destination MAC address, a destination IP address, a source MAC address, a source IP address and/or a transfer protocol. In other embodiments, the header can include any other identifying information associated with the data packet, such as, for example, a priority indicator.

The packet processor 850 can use the information within the header to assign the data packet to a virtual channel operatively coupling the module $D_1$ and another module within the switch fabric. For example, the packet processor 850 can assign the data packet to an output queue 885 randomly, based on the available capacity of each output queue 885, based on the results of a hash function, based on a look-up table, based on an indication from a central controller and/or using any other method. Such a hash function and/or look-up table can use as an input a header value such as, for example, a destination MAC address, a destination IP address, a source MAC address, a source IP address, a priority indicator, a transfer protocol and/or any other suitable value. In some embodiments, for example, a look-up table and/or a hash function can associate each output queue 885 with a range of IP and/or MAC addresses. In embodiments using a central controller, the central controller can monitor use and/or congestion of each virtual channel and dynamically assign data packets to the virtual channels to optimize the flow of traffic through the switch fabric.

After the packet processor 850 assigns the data packet to an output queue 885, the packet processer 850 can append a second virtual channel ID (e.g., similar to virtual channel ID 730) to the data packet (e.g., similar to data packet 700). The second virtual channel ID can be associated with a virtual channel operatively coupling the module $D_1$ with another module within the switch fabric. Additionally the second virtual channel ID is associated with the output queue 885 to which the data packet is assigned. The packet processor 850 can then store the data packet in the assigned output queue 885.

Using the virtual channel counters, which are incremented by incoming packets and decremented by outgoing packets, the packet processor 850 can determine which virtual channels are the source of congestion and send flow control signals accordingly. For example, as shown in FIG. 9, input virtual channel VC1 has 10 data packets in the output queues 885 below the threshold of 20. Accordingly, no action is taken by the packet processor 850 with respect to input virtual channel VC1. Input virtual channel VC2, however, has 21 data packets in the output queues 885. Accordingly, the packet processor 850 can send a flow control signal to the module sending data to the module $D_1$ via the virtual channel VC2. As discussed above, such a flow control signal can suspend data from being sent to the module $D_1$ via the virtual channel VC2.

While shown and described with respect to FIG. 9 as using a number of data packets received from a virtual channel as the threshold, in other embodiments, any other suitable measure can be used. In some embodiments, for example, a rate of incoming data packets (e.g., number of data packets received on a virtual channel per time period) can be used. In such embodiments, if the rate of incoming packets on a virtual channel is above a threshold, the module $D_1$ can send a flow control signal. In such embodiments, the packet processor 850 need not decrement the input virtual channel counter based on outgoing data packets (i.e., the data packets sent via the output ports 870). For example, the packet processor can include a time-based counter so that if a certain number of packets are received within a certain time period, the threshold is exceeded and the flow control signal is sent. In other embodiments, a size of data packets can be used. In such embodiments, when the collective size of the data packets received via a virtual channel exceeds a threshold, the module $D_1$ can send a flow control signal.

Figure 10:
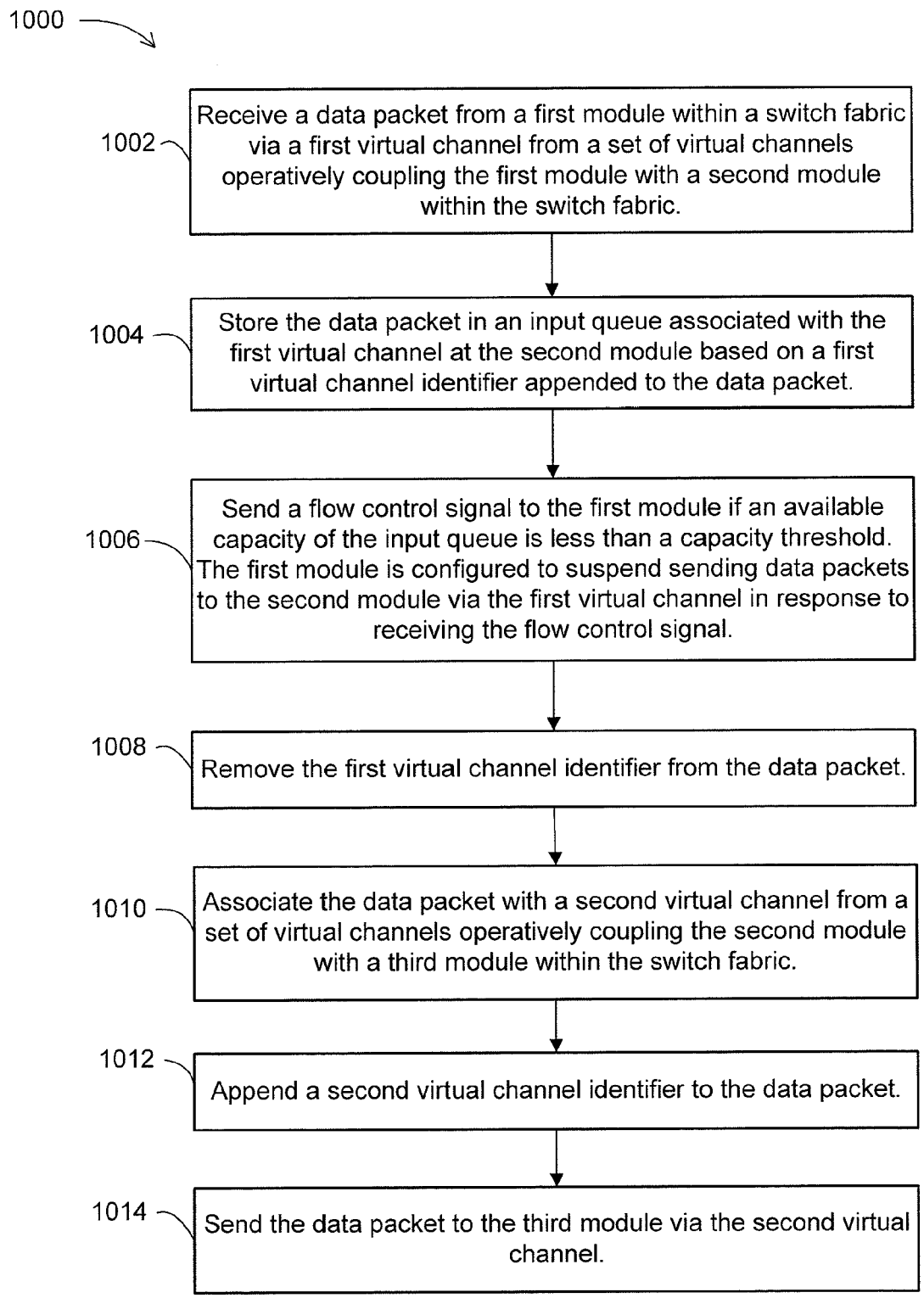
FIG. 10 is a flow chart illustrating a method of sending a data packet through a switch fabric, according to another embodiment.

FIG. 10 is a flow chart illustrating a method 1000 of sending a data packet through a switch fabric, according to another embodiment. The method 1000 includes receiving a data packet from a first module within a switch fabric via a first virtual channel from a set of virtual channels operatively coupling the first module with a second module within the switch fabric, at 1002. The set of virtual channels can be included within a single physical hop between the first module and the second module. The single physical hop can be part of a single logical hop.

The data packet is stored in an input queue associated with the first virtual channel at the second module based on a first virtual channel identifier appended to the data packet, at 1004. In some embodiments, a packet processor of the first module can append the first virtual channel identifier to the data packet prior to sending the data packet through the first virtual channel.

A flow control signal is sent to the first module if an available capacity of the input queue is less than a capacity threshold, at 1006. The first module is configured to suspend sending data packets to the second module via the first virtual channel in response to receiving the flow control signal. In some embodiments, the first module can remove an output queue associated with the first virtual channel from a schedule associated with sending data packets via the first virtual channel. Such a schedule can be a round robin schedule, a priority-based schedule, a capacity-based schedule, and/or the like.

The first virtual channel identifier is removed from the data packet, at 1008. In some embodiments a packet processor of the second module can remove the first virtual identifier. The data packet is then associated with a second virtual channel from a set of virtual channels operatively coupling the second module with a third module within the switch fabric, at 1010. In some embodiments, the data packet is associated with the second virtual channel randomly, based on the results of a hash function, based on a lookup table, based on an available capacity of output queues associated with the virtual channels, and/or the like.

A virtual channel identifier is appended to the data packet, at 1012, and the data packet is sent to the third module via the second virtual channel, at 1014. Using the second virtual channel identifier, the third module can determine from which virtual channel the data packet was received, and store the data packet in an input queue accordingly.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

While shown and described above as being a three-stage switch fabric, in other embodiments, the switch fabric can include any number of stages. In some embodiments, for example, the switch fabric can be a five stage switch fabric similar to the switch fabric shown and described in co-pending U.S. patent application Ser. No. 12/345,500, filed on Dec. 29, 2008, and entitled System Architecture for a Scalable and Distributed Multi-Stage Switch Fabric," and co-pending U.S. patent application Ser. No. 12/345,502, filed on Dec. 29, 2008, and entitled "Methods and Apparatus Related to a Modular Switch Architecture," each of which is incorporated herein by reference in its entirety.

In some embodiments, not every module and/or physical hop within a switch fabric includes virtual channels and/or virtual channel flow control. In some embodiments, for example, only the modules and/or the physical hops having high traffic and/or congestion include virtual channels and/or virtual channel flow control. Such modules and/or physical hops can be determined by a central controller configured to monitor the traffic and/or congestion within the switch fabric.

In other embodiments, every module and/or physical hop within a switch fabric includes virtual channels and/or virtual channel flow control.

In some embodiments, the flow control systems and/or methods described herein can be used with other flow control systems and/or methods. For example, a switch fabric system can include flow control between modules outside the switch fabric. For example, the virtual channel flow control described herein can be used between peripheral devices and edge devices and/or between edge devices and a first stage of the switch fabric. Additionally, other types of flow control systems used can be similar to the flow control systems and methods shown and described in co-pending U.S. patent application Ser. No. 12/345,490, filed Dec. 29, 2008, entitled "Flow-Control in a Switch Fabric," and/or co-pending U.S. patent application Ser. No. 12/771,413, filed Apr. 30, 2010, entitled "Methods and Apparatus for Flow Control Associated with a Switch Fabric," the disclosures of which are incorporated herein by reference in their entireties.

In some embodiments, the flow control systems and/or methods described herein can be used with an edge flow control loop, a priority flow control loop and/or a link flow control loop similar to the edge flow control loops, the priority flow control loops and the link flow control loops shown and described in co-pending U.S. patent application Ser. No. 12/242,224, filed on Sep. 30, 2008, entitled "Methods and Apparatus for Flow Control Associated with Multi-Staged Queues;" co-pending U.S. patent application Ser. No. 12/242,230, filed Sep. 30, 2008, entitled "Methods and Apparatus for Flow-Controllable Multi-Staged Queues;" and co-pending U.S. patent application Ser. No. 12/558,118, filed Sep. 11, 2009, entitled "Methods and Apparatus for Defining a Flow Control Signal Related to a Transmit Queue;" each of which is incorporated herein by reference in its entirety.

While shown and described above as having a single capacity threshold, an input queue at a module within the switch fabric can include any number of thresholds. In some embodiments, for example, as an available capacity of an input queue associated with a virtual channel falls below a first threshold, a flow control signal can be sent to reduce the rate at which data packets are sent via the virtual channel. If the available capacity of the input queue then falls below a second threshold, a flow control signal can be sent to suspend data packets from being sent via the virtual channel. In other embodiments, as the available capacity of the queue falls below various thresholds, various flow control signals can be sent to incrementally reduce the rate at which data packets are sent via the virtual channel.

In some embodiments, flow control signals can suspend data packets and/or cells from being sent via a virtual channel based on any criteria. For example, the flow control signals can cause a module to suspend sending data packets via a virtual channel based on the size of the data packet, a destination of a data packet, the contents of the data packet, and/or the like.

The input queues and/or the output queues shown and described above can be implemented using any suitable method and/or structure. In some embodiments, for example, a linked list is used within a shared memory buffer. In other embodiments, a memory is partitioned into multiple blocks with each block defining a queue. In still other embodiments, any other suitable method can be used.

In some embodiments, each edge device of a switch fabric system can split and/or partition each data packet received from the peripheral processing devices into similarly sized cells. For example, a data packet received at the edge device $E_1$ of FIG. 4 from the peripheral processing device $S_1$ can be split into cells. Each cell can receive a switch fabric header containing destination information. Using the switch fabric header, the switch fabric (e.g., 430) can route the cells to the edge device $E_3$. The edge device $E_3$ can then reassemble the cells to form and/or reconstruct the data packet in preparation of sending the data packet to a peripheral processing device (e.g., $S_6$).

Embodiments shown and described above refer to multiple peripheral processing devices, including compute notes, storage nodes, service nodes and routers. In some embodiments, one or more of the compute nodes can be general-purpose computational engines that can include, for example, processors, memory, and/or one or more network interface devices (e.g., a network interface card (NIC)). In some embodiments, the processors within a compute node can be part of one or more cache coherent domains. In some embodiments, the compute nodes can be host devices, servers, and/or so forth. In some embodiments, one or more of the compute nodes can have virtualized resources such that any compute node (or a portion thereof) can be substituted for any other compute node (or a portion thereof) operatively coupled to a switch fabric system.

In some embodiments, one or more of the storage nodes can be devices that include, for example, processors, memory, locally-attached disk storage, and/or one or more network interface devices. In some embodiments, the storage nodes can have specialized modules (e.g., hardware modules and/or software modules) configured to enable, for example, one or more of the compute nodes to read data from and/or write data to one or more of the storage nodes via a switch fabric. In some embodiments, one or more of the storage nodes can have virtualized resources so that any storage node (or a portion thereof) can be substituted for any other storage node (or a portion thereof) operatively coupled to a switch fabric system.

In some embodiments, one or more of the services nodes can be an open systems interconnection (OSI) layer-4 through layer-7 device that can include, for example, processors (e.g., network processors), memory, and/or one or more network interface devices (e.g., 10 Gb Ethernet devices). In some embodiments, the services nodes can include hardware and/or software configured to perform computations on relatively heavy network workloads. In some embodiments, the services nodes can be configured to perform computations on a per packet basis in a relatively efficient fashion (e.g., more efficiently than can be performed at, for example, a compute node 110). The computations can include, for example, stateful firewall computations, intrusion detection and prevention (IDP) computations, extensible markup language (XML) acceleration computations, transmission control protocol (TCP) termination computations, and/or application-level load-balancing computations. In some embodiments, one or more of the services nodes can have virtualized resources so that any service node (or a portion thereof) can be substituted for any other service node (or a portion thereof) operatively coupled to a switch fabric system.

In some embodiments, one or more of the routers can be networking devices configured to connect at least a portion of a switch fabric system (e.g., a data center) to another network (e.g., the global Internet). In some embodiments, for example, a router can enable communication between components (e.g., peripheral processing devices, portions of the switch fabric) associated with a switch fabric system. The communication can be defined based on, for example, a layer-3 routing protocol. In some embodiments, one or more of the routers can have one or more network interface devices (e.g., 10 Gb Ethernet devices) through which the routers can send signals to and/or receive signals from, for example, a switch fabric and/or other peripheral processing devices.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:
1. A system, comprising:
a processor operatively coupled to a memory and configured to execute a module associated with a first stage of a switch fabric;
a module associated with a second stage of the switch fabric, the module associated with the first stage being directly coupled to the module associated with the second stage via a single physical hop having a plurality of virtual channels;
the module associated with the first stage being configured to assign a virtual channel identifier associated with a virtual channel from the plurality of virtual channels to a data packet, the module associated with the first stage configured to send the data packet through the virtual channel based on the virtual channel identifier, the module associated with the second stage configured to store the data packet in a queue associated with the virtual channel based on the virtual channel identifier, the module associated with the first stage having a plurality of output queues, each output queue from the plurality of output queues being associated with a virtual channel from the plurality of virtual channels, the module associated with the first stage being configured to assign the virtual channel identifier based on a result of a hash function that uses as inputs (1) a value of a header of the data packet and (2) an available capacity of each associated output queue from the plurality of output queues; and the module associated with the second stage configured to send a flow control signal to the module associated with the first stage when an available capacity of the queue is less than a predetermined threshold, the module associated with the first stage configured to suspend sending data packets via the virtual channel in response to the flow control signal.

2. The system of claim 1, wherein, the module associated with the first stage being configured to assign data packets to the virtual channel from the plurality of virtual channels after receiving the flow control signal.

3. The system of claim 1, wherein the module associated with the first stage is configured to alternate sending data through the plurality of virtual channels based on a round robin scheduler.

4. The system of claim 1, wherein the module associated with the first stage is configured to alternate sending data through the plurality of virtual channels based on a priority-based scheduler.

5. The system of claim 1, wherein the module associated with the first stage is configured to alternate sending data through the plurality of virtual channels based on a congestion based scheduler.

6. The system of claim 1, wherein the switch fabric is part of a single logical hop.

7. A system, comprising:
a first switch stage of a switch fabric having a plurality of output queues, the first switch stage configured to associate incoming data with an output queue from the plurality of output queues, each output queue from the plurality of output queues associated with and configured to send data through a virtual channel from a plurality of virtual channels associated with a single physical hop, the plurality of output queues configured to alternate sending data through the plurality of virtual channels based on a schedule, the first switch stage configured to associate the incoming data with the output queue from the plurality of output queues based on a result of a hash function that uses as inputs (1) a value of a header of the incoming data and (2) an available capacity of each output queue from the plurality of output queues; and
a second switch stage of the switch fabric operatively coupled to the first switch stage via the plurality of virtual channels, the second switch stage having a plurality of input queues, each input queue from the plurality of input queues being associated with a virtual channel from the plurality of virtual channels, each input queue from the plurality of input queues having a capacity threshold,
the second switch stage configured to send a flow control signal to an output queue associated with a virtual channel from the plurality of virtual channels if an available capacity of the input queue associated with that virtual channel is less than its capacity threshold, the first switch stage configured to remove the output queue from the schedule in response to receiving the flow control signal.

8. The system of claim 7, wherein the schedule is a round robin schedule.

9. The system of claim 7, wherein the first switch stage is configured to remove the output queue from the schedule for a predetermined time period in response to receiving the flow control signal, the first switch stage configured to reinsert the output queue into the schedule after the predetermined time period.

10. The system of claim 7, wherein the schedule is a priority-based schedule.

11. The system of claim 7, wherein an output queue from the plurality of output queues has an amount of available capacity no greater than an amount of available capacity for each remaining output queue from the plurality of output queues, the first switch stage configured such that the output queue is first to send data through the plurality of virtual channels based on the schedule.

12. The system of claim 7, wherein the value of the header of the incoming data includes a destination identifier.

13. The system of claim 7, wherein the data includes a plurality of data packets, the first switch stage configured to append a virtual channel identifier to each data packet from the plurality of data packets prior to sending each data packet from the plurality of data packets through the plurality of virtual channels.

14. The system of claim 7, wherein the switch fabric is part of a single logical hop.

15. A system, comprising:
a processor operatively coupled to a memory and configured to execute a module associated with a first stage of a switch fabric;
the module associated with a first stage of a switch fabric configured to assign data packets to virtual channels from a first plurality of virtual channels, the first plurality of virtual channels being associated with a first single physical hop, the module associated with the first stage configured to alternate sending data through each virtual channel from the first plurality of virtual channels based on a first schedule, the switch fabric being part of a single logical hop, each output queue from a plurality of output queues at the first stage being associated with a virtual channel from the first plurality of virtual channels, each output queue from the plurality of output queues configured to store and send the assigned data packets through its associated virtual channel, the module associated with the first stage configured to assign the data packets to the virtual channels based on a result of a first hash function that uses as input (1) a value of a header of at least one of the data packets and (2) an available capacity of each associated output queue from the plurality of output queues;
a module associated with a second stage of the switch fabric configured to receive data packets from the first plurality of virtual channels, the module associated with the second stage configured to assign the data packets to virtual channels from a second plurality of virtual channels based on a result of a second hash function, the second plurality of virtual channels being associated with a second single physical hop, the module associated with the second stage configured to alternate sending data through each virtual channel from the second plurality of virtual channels based on a second schedule; and
a module associated with a third stage of the switch fabric, the module associated with the third stage configured to receive data packets from the second plurality of virtual channels.

16. The system of claim 15, wherein the module associated with the second stage is configured to send a flow control signal to the module associated with the first stage when an available capacity of an input queue associated with a virtual channel from the first plurality of virtual channels is less than a capacity threshold, the module associated with the first stage configured to suspend sending data packets via the virtual channel from the first plurality of virtual channels in response to receiving the flow control signal.

17. The system of claim 15, wherein the first schedule is selected from the group consisting of a round robin schedule and a priority-based schedule.

18. The system of claim 15, wherein the first hash function uses a value of a header of the data packets as an input.

19. The system of claim 15, wherein the module associated with the first stage is configured to append a virtual channel identifier from a first plurality of virtual channel identifiers to each data packet prior to sending the data packets through the first plurality of virtual channels, each virtual channel identifier from the first plurality of virtual channel identifiers being associated a virtual channel from the first plurality of virtual channels, the module associated with the second stage configured to remove the virtual channel identifier from the first plurality of virtual channel identifiers from each data packet and append a virtual channel identifier from a second plurality of virtual identifiers to each data packet prior to sending the data packets through the second plurality of virtual channels, each virtual channel identifier from the second plurality of virtual channel identifiers being associated with a virtual channel from the second plurality of virtual channels.

\* \* \* \* \*